US009600501B1

(12) United States Patent
Fuller

(10) Patent No.: US 9,600,501 B1
(45) Date of Patent: Mar. 21, 2017

(54) TRANSMITTING AND RECEIVING DATA BETWEEN DATABASES WITH DIFFERENT DATABASE PROCESSING CAPABILITIES

(71) Applicant: Google Inc., Mountain View, CA (US)

(72) Inventor: Alfred R. K. Fuller, San Carlos, CA (US)

(73) Assignee: GOOGLE INC., Mountain View, CA (US)

(*) Notice: Subject to any disclaimer, the term of this patent is extended or adjusted under 35 U.S.C. 154(b) by 506 days.

(21) Appl. No.: 14/088,283

(22) Filed: Nov. 22, 2013

Related U.S. Application Data

(60) Provisional application No. 61/729,995, filed on Nov. 26, 2012.

(51) Int. Cl.
*G06F 17/30* (2006.01)
(52) U.S. Cl.
CPC .............. *G06F 17/30289* (2013.01)
(58) Field of Classification Search
CPC ......... G06F 17/30002; G06F 17/30292; G06F 17/30312; G06F 17/30389; G06F 17/30424
See application file for complete search history.

(56) References Cited

U.S. PATENT DOCUMENTS

| 7,346,598 | B2* | 3/2008 | Arora | G06F 17/30569 |
| 8,145,667 | B2* | 3/2012 | Leung | G06F 17/3092 |
| | | | | 707/770 |
| 8,862,588 | B1* | 10/2014 | Gay | G06F 17/30336 |
| | | | | 707/741 |
| 9,201,924 | B1* | 12/2015 | Fuller | G06F 17/30463 |
| 2003/0033317 | A1* | 2/2003 | Ziglin | G06F 17/30557 |
| 2004/0167904 | A1* | 8/2004 | Wen | G06F 17/30914 |
| 2005/0228792 | A1* | 10/2005 | Chandrasekaran | G06F 17/2205 |
| 2007/0219959 | A1* | 9/2007 | Kanemasa | G06F 17/30932 |
| 2008/0183689 | A1* | 7/2008 | Kubota | G06F 17/30929 |
| 2013/0124669 | A1* | 5/2013 | Anderson | G06F 11/3006 |
| | | | | 709/217 |

* cited by examiner

*Primary Examiner* — Cheryl Lewis
(74) *Attorney, Agent, or Firm* — Morgan, Lewis & Bockius LLP

(57) ABSTRACT

A server system having one or more processors and memory sends, to a first database, a first request for data based on first data-retrieval criteria. The first database is schemaless and operates in accordance with first database processing capabilities. The server system receives, in response to the first request, a first set of data from the first database, where the first set of data is selected by the first database in accordance with the first data-retrieval criteria. The server system generates a second database from the first set of data selectively retrieved from the first database. The second database has an associated schema and operates in accordance with second database processing capabilities different from the first database processing capabilities. The server system provides access to the first set of data in the second database in accordance with the second database processing capabilities.

18 Claims, 19 Drawing Sheets

First Database
140

| | Keys 602 | Kind 604 | Properties 606 |
|---|---|---|---|
| Entity 0 | 0 | Kind = person | Name = Mike, Age = 51, Birthday = 03/10/1961 |
| Entity 1 | 1 | Kind = business | City = Palo Alto, Employees = 5 |
| Entity 2 | 2 | Kind = person | Name = Jane, Age = 61, Birthday = 11/01/1951 |
| Entity 3 | 3 | Kind = business | City = New York, Employees = 1000 |
| Entity 4 | 4 | Kind = person | Name = Don, Age = 21, Birthday = 05/05/1991 |
| ⋮ | | | |
| Entity 120 | 120 | Kind = picture | Size = 5Mbytes, Pixels = 8M, Camera = Sony |
| Entity 121 | 121 | Kind = business | City = Miami, Employees = 20 |
| Entity 122 | 122 | Kind = business | City = Boston, Employees = 5000 |
| Entity 123 | 123 | Kind = picture | Size = 7Mbytes, Pixels = 10M, Camera = Nikon |
| ⋮ | | | |
| Entity 700 | 700 | Kind = picture | Size = 2Mbytes, Pixels = 4M, Camera = Canon |
| Entity 701 | 701 | Kind = person | Name = Karen, Age = 31, Birthday = 01/01/1981 |
| Entity 702 | 702 | Kind = picture | Size = 2Mbytes, Pixels = 3M, Camera = Sony |
| Entity 703 | 703 | Kind = person | Name = Tom, Age = 61, Birthday = 11/01/1951 |
| ⋮ | | | |

Figure 6A

TRANSMITTING AND RECEIVING DATA BETWEEN DATABASES WITH DIFFERENT DATABASE PROCESSING CAPABILITIES

RELATED APPLICATIONS

This application claims priority to U.S. Provisional Patent Application No. 61/729,995 filed Nov. 26, 2012, which is hereby incorporated by reference in its entirety.

BACKGROUND OF THE INVENTION

Datastore server systems store large amounts of data and receive requests from requestors (such as, client systems and applications) for stored data. However, retrieving data from a datastore can be a resource intensive process when there are a large number of queries and/or the datastore includes a large amount of data.

SUMMARY

The present invention relates generally to the field of distributed client-server computer network systems, and in particular, to a system and method for transmitting and receiving data between databases with different database processing capabilities. Many approaches to improving the speed and efficiency of retrieving data from a datastore reduce the flexibility of the datastore, thereby limiting the types of queries that can be processed by the Datastore server system. For example, one approach to improving the efficiency of query-processing on large volumes of data stored in a schemaless database, involves constructing multiple sorted indexes from the schemaless database. These sorted indexes increase the speed and efficiency of executing search queries, however, the searches that can be processed using the sorted indexes are limited to types of queries that are supported by the indexes. In other words, the data structures (e.g., indexes) that improve the speed and efficiency of processing queries also limit the types of queries that can be processed.

In particular, schemaless entity databases and sorted indexes derived therefrom, while advantageous for efficiency of query-processing, do not support processing certain types of queries that are readily supported, for instance, by traditional relational databases that adhere to fixed schemas but handle large quantities of data less efficiently. For example, schemaless databases generally do not provide the capability to combine entities from two or more different tables of the schemaless database based on query-specified criteria (e.g., schemaless databases do not typically support structured query language—SQL—join operations), which many traditional relational databases do support.

It would be desirable to obtain the benefits of efficient data-storage and data-retrieval provided by schemaless entity databases and sorted indexes, while still providing for the ability to process queries and support query-syntaxes not traditionally supported by schemaless entity databases and sorted indexes derived from schemaless databases. To achieve the objective of combining the speed and efficiency of schemaless databases with the expanded query syntax capabilities of schema-based databases, an interface database and an interface database server system provide a limited, sharded, prioritized view of a schemaless database. The interface database, derived from a schemaless database, can be organized with a variety of different schemas that enable complex and/or arbitrary syntax that do not scale well. Thus, a requestor can direct queries that are not supported by the schemaless database to the interface database. Additionally, the interface database can be generated and/or updated periodically (e.g., at regular intervals or in response to requests from the requestor) to ensure that the interface database accurately reflects data stored in the schemaless database. Accordingly, such a system provides both the benefits of schemaless databases (efficient data storage and data-retrieval) and the benefits of schema-based databases (support for query-syntaxes not supported by schemaless databases), while overcoming limitations of both types of databases.

In some embodiments, a method is performed at a server system having one or more processors and memory storing one or more programs for execution by the one or more processors so as to perform the method. The method includes sending, to a first database, a first request for data based on first data-retrieval criteria, where the first database is schemaless and operates in accordance with first database processing capabilities and receiving, in response to the first request, a first set of data from the first database, where the first set of data is selected by the first database in accordance with the first data-retrieval criteria. The method also includes generating a second database from the first set of data selectively retrieved from the first database, where the second database has an associated schema and operates in accordance with second database processing capabilities different from the first database processing capabilities. The method further includes providing access to the first set of data in the second database in accordance with the second database processing capabilities.

In accordance with some embodiments, a computer system (e.g., a server system) includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 6A is a block diagram illustrating an entity database including information about entities stored in the High-Volume Datastore, in accordance with some embodiments.

DESCRIPTION OF EMBODIMENTS

It will also be understood that, although the terms "first," "second," etc. are used herein to describe various elements, these elements should not be limited by these terms. These terms are only used to distinguish one element from another. For example, a first entity could be termed a second entity, and, similarly, a second entity could be termed a first entity, without changing the meaning of the description, so long as all occurrences of the "first entity" are renamed consistently and all occurrences of the second entity are renamed consistently. The first entity and the second entity are both entities, but they are not the same entity.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can, optionally be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" should be construed to mean "upon determining" or "in response to determining" or "in accordance with a determination" or "upon detecting" or "in response to detecting" that the stated condition precedent is true, depending on the context.

The embodiments described below include client and server systems, which typically inter-operate in a distributed client-server system and corresponding methods of transmitting and receiving data at the server system between databases with different database processing capabilities.

Figure 1:
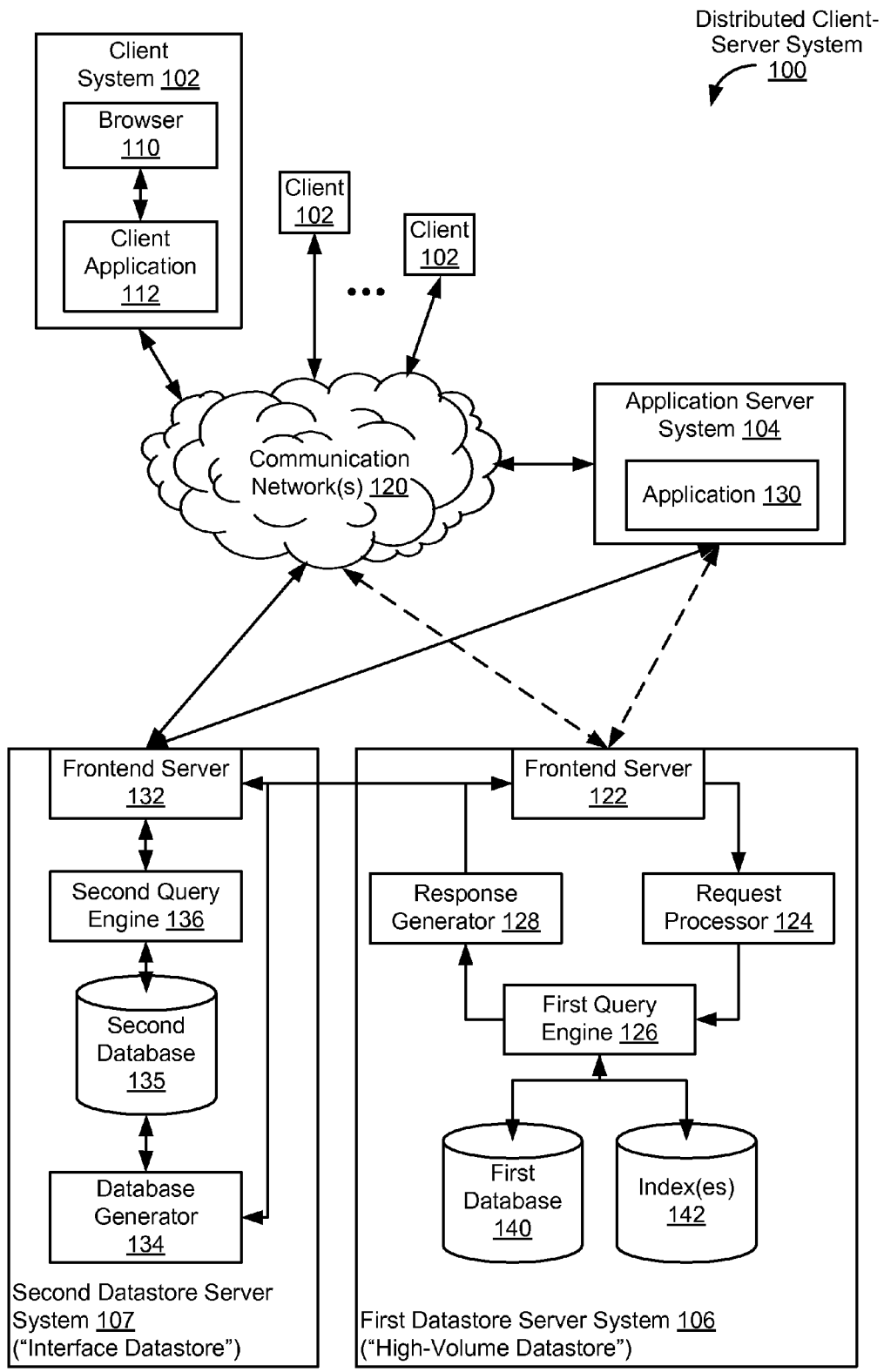
FIG. 1 is a block diagram illustrating a distributed client-server system, in accordance with some embodiments.

FIG. 1 includes a block diagram illustrating an example of a distributed client-server system 100 for responding to queries based on data transferred between two sets of databases with different database processing capabilities. System 100 includes one or more Client System(s) 102 (also referred to herein as "Client 102"), an Application Server System 104 (referred to herein as "App Server 104"), First Datastore Server System 106 (also referred to herein as "First Datastore 106" or "High-Volume Datastore 106"), Second Datastore Server System 107 (also referred to herein as "Second Datastore 107" or "Interface Datastore 107"), and a Communication Network 120 for connecting Clients 102 and/or App Server 104 to Interface Datastore 107 and, optionally, to High-Volume Datastore 106. Communication Network 120 optionally includes the Internet, one or more local area networks (LANs), one or more wide area networks (WANs), other types of networks, or a combination of such networks.

Client 102 optionally includes Browser 110 and/or Client Application 112. Browser 110 can be a general purpose Internet browser (sometimes called a Web browser) having a browser window used for displaying an application interface. A web application for submitting a data request is optionally implemented using hypertext markup language (HTML) or extensible markup language (XML) elements that are rendered by Browser 110. Alternatively, a data request is, optionally, submitted via a standalone Client Application 112. After a user submits a data request through Browser 110 or stand-alone Client Application 112, Client 102 relays the request to App Server 104, High-Volume Datastore 106 or Interface Datastore 107 via Communication Network 120. If the request is relayed to App Server 104, App Server 104 provides a corresponding request to Interface Datastore 107.

If Interface Datastore 107 includes a database that is adapted for responding to the request, Interface Datastore 107 (optionally, in conjunction with High-Volume Datastore 106) identifies a plurality of matching entities from Second Database 135 (if present at Interface Datastore 107 prior to receiving the request) and transfers search results including representations of the matching entities and, optionally, a set of display information back to Client 102 or App Server 104. If Interface Datastore 107 does not include a database that is adapted for responding to the request (e.g., Second Database 135 has not yet been generated) at the time of receiving the request, Interface Datastore 107 generates Second Database 135 (based on data obtained from High-Volume Datastore 106) in response to receiving the request. Client Application 112 and/or Browser 110 use the search results and displays information to render a set of search results at Client 102. Alternatively, for some requests that can be handled by a datastore with the database processing capabilities of High-Volume Datastore 106 (as described in greater detail below), the request is sent directly to High-Volume Datastore 106 by a requestor (e.g., Client 102 or App Server 104).

In some embodiments, App Server 104 includes Application 130. In some implementations, Application 130 is a backend application for receiving and responding to requests from an application (e.g., Client Application 112) at Client 102. Application 130 transmits data requests to Interface Datastore 107 or High-Volume Datastore 106 (e.g., to request data for use in responding to a request from an application at Client 102). It should be understood that in some embodiments, requests from Client 102 are transmitted to Interface Datastore 107 without an intermediary backend application, while in other embodiments requests from Client 102 are transmitted to Application 130 on App Server 104 and Application 130 communicates with Interface Datastore 107. Additionally, in some implementations it is advantageous to handle some client requests without an intermediary backend application at App Server 104, while other client requests are handled by an intermediary backend application (e.g., Application 130).

As shown in FIG. 1, Distributed Client-Server System 100 includes two datastore server systems—High-Volume Datastore 106 and Interface Datastore 107. In some embodiments, High-Volume Datastore 106 and Interface Datastore 107 inter-operate as two datastore server systems forming two parts of one common system. High-Volume Datastore 106 and Interface Datastore 107 differ in their respective database processing capabilities (e.g., as described in further detail below with reference to FIGS. 9F-9H). For example, High-Volume Datastore 106 stores First Database 140 which does not have a strict schema and has database processing capabilities that enable efficient storage and retrieval of large sets of data and enable High-Volume Datastore 106 to perform data operations (e.g., store and execute queries) against the large sets of data more quickly and efficiently than the same data operations could be performed at Interface Datastore 107. However, High-Volume Datastore 106 has limited or no capabilities to support certain query syntaxes that are readily supported by Interface Datastore 107. On the other hand, Interface Datastore 107 stores Second Database 135 that is generated from data entities that include partial "views" of data stored in First Database 140. Furthermore, Second Database 135 adheres to a strict schema and thus can support query syntaxes not supported by First Database 140 stored in High-Volume Datastore 106. However, Interface Datastore 107 typically does not include all of the available data (e.g., because Interface Datastore 107 has constrained storage capacity). For example, if Second Database 135 is stored in high speed memory (e.g., to increase the speed of responses to search queries), the size of Second Database 135 is limited by the storage capacity of the high speed memory. Typically, high speed memory such as RAM is more expensive than lower speed storage devices or media such as magnetic hard disk drives, and thus the storage capacity of high speed memory is limited by cost considerations where the capacity of lower speed storage is generally not limited by cost considerations.

High-Volume Datastore 106 includes Frontend Server 122, Request Processor 124, First Query Engine 126, Response Generator 128, First Database 140 and one or more Indexes 142. As described above (and in further detail with reference to FIGS. 9F-9H), in some implementations, First Database 140 is schemaless (e.g., data is stored in First Database 140 without reference to a predefined schema). Furthermore, in some embodiments, First Database 140 includes multiple sorted indexes (e.g., Index(es) 142) adapted for retrieving data from a schemaless database (e.g., First Database 140). Index Generator 130 processes information about the entities that are stored in First Database 140 to produce Index(es) 142 for use by First Query Engine 126 when performing a search query on First Database 140.

Frontend Server 122 relays queries from Interface Datastore 107 (e.g., from Frontend Server 132) and, optionally, from Clients 102 or App Server 104 to Request Processor 124, which optionally plans a query by selecting an order to apply filters and sort orders specified in the query and transmits the planned search query to Query Engine 126. In some implementations, Request Processor 124 plans the query so as to improve the performance characteristics of the query (e.g., by determining an order to apply filters that reduces the time to perform the query and/or reduces the maximum or total processor usage). First Query Engine 126 identifies, in Indexes 142, index portions adapted for responding to the search query and performs the search query using the identified indexes and/or index portions to identify search results for the search query.

In some implementations, the matching entities are identified one at a time or in small batches in a predefined order (e.g., an order defined by the search query or a system defined order). Thus when the indexes and/or index portions are sorted by a predefined property such as relevance or recency, First Query Engine 126 can easily retrieve the twenty most relevant/recent results and then stop searching the identified indexes or index portions. After identifying matching entities, First Query Engine 126 retrieves information about the matching entities (optionally including information about database schema) from First Database 140 and passes the information to Response Generator 128. Response Generator 128 generates a response including at least a portion of the information about the matching entities. Response Generator 128 also, optionally, determines display information for the results. The results and, optionally, display information passed to Frontend Server 122, which in turn passes the results to Interface Datastore 107 (e.g., Database Generator 134) for use in generating or updating Second Database 135. Alternatively, Frontend Server 122 passes the results to App Server 104 or to Client 102 via Communication Network 120 for display at Client 102 (e.g., via Browser 110 or Client Application 112).

In some implementations, Frontend Server 122 transmits data (e.g., entities and, optionally, information about the database schema) to Database Generator 134 in response to a query that was generated preemptively by Interface Datastore 107 (e.g., a query that was generated in anticipation of, and prior to, receiving a corresponding request from Client 102 or App Server 104). In some implementations, this approach of proactive database generation is useful for generating a second database at Interface Datastore 107 for commonly or frequently received queries. In some embodiments, if a query is received that is readily supported by First Database 140 (in other words, if processing the query does not require the database to adhere to a fixed schema, or if the query syntax does not specify a fixed schema) then First Database 140 stored at High-Volume Datastore 106 is used to process the query instead of Second Database 135 at Interface Datastore 107.

Interface Datastore 107 includes Frontend Server 132, Second Query Engine 136, Database Generator 134, and Second Database 135. Second Query Engine 136 processes data stored in Second Database 135 when performing a query. Second Database 135 is generated from entities and optionally information about the database schema retrieved from First Database 140. Database Generator 134 systematically retrieves data (e.g., entities) and information about the data (including, optionally, a database schema) from High-Volume Datastore 106 and generates Second Database 135. These operations are optionally performed by Database Generator 134 prior to receiving the query from Client 102 or App Server 104 (e.g., Second Database 135 is pre-generated so as to be available to respond to the query). Generating Second Database 135 prior to receiving the search query increases the speed with which search results can be retrieved, thereby reducing latency of the search operation and returning results to users more quickly. Alternatively, or in addition, Second Database 135 is optionally generated by Database Generator 134 in response to receiving the query from Client 102 or App Server 104 (e.g., Second Database 135 is generated reactively the first time that a query is received that is to be used by Interface Datastore 107 to generate a response). In addition, Database Generator 134 typically continues to update data in Second Database 135 in between queries or in response to changes in data (in First Database 140) stored at High-Volume Datastore 106.

Frontend Server 132 relays requests or queries received from Clients 102 or App Server 104 to High-Volume Datastore 106 (Frontend Server 122) for retrieval of data (from First Database 140) adapted to perform the received requests or queries and to generate responses. Alternatively, Frontend Server 132 relays requests or queries directly to Second Query Engine 136. Second Query Engine 136 optionally plans a query by selecting a sequence of steps to be performed on the data in Second Database 135. The Second Query Engine 136 plans the query so as to improve the performance characteristics of the query and performs the search query on Second Database 135 to identify search results. Second Query Engine 136 transmits search results generated from Second Database 135 to Frontend Server 132, which in turn transmits the results to Client 102 or App Server 104. Thus, in response to a query submitted to Interface Datastore 107, Client 102 receives a response including entities obtained from a schema-based database (Second Database 135), which was previously generated using data retrieved from a schemaless database (e.g., First Database 140).

Figure 2:
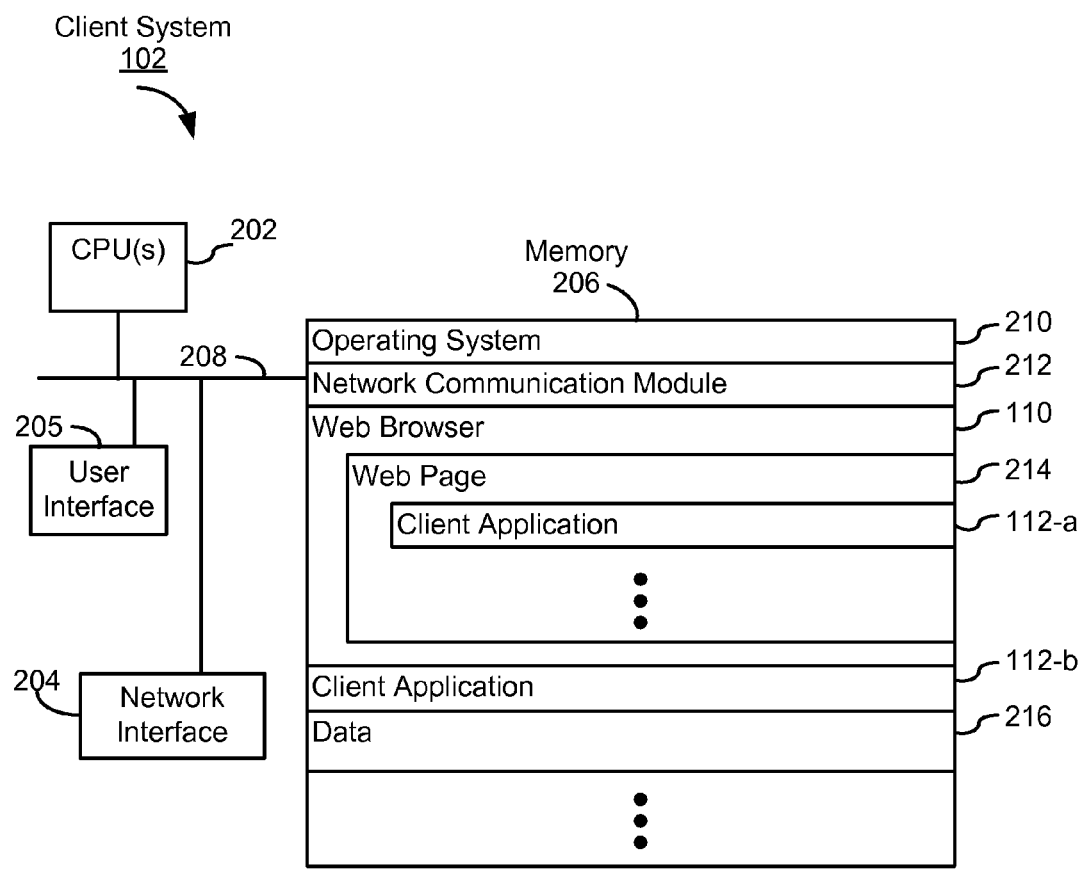
FIG. 2 is a block diagram illustrating a client system, in accordance with some embodiments.

FIG. 2 is a block diagram illustrating a Client System 102 in accordance with some embodiments. Client 102 typically includes one or more processing units CPU(s) 202, one or more network or other Communication Interfaces 204, Memory 206 a User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

- Operating System 210 that includes procedures for handling various basic system services and for performing hardware dependent tasks;
- Network Communication Module (or instructions) 212 that is used for connecting Client System 102 to other computers (e.g., Application Server System 104, High-Volume Datastore 106 or Interface Datastore 107) via one or more Network Interfaces 204 (wired or wireless) and one or more Communication Networks 120 (FIG. 1), such as the Internet, other wide area networks, local area networks, metropolitan area networks, and so on;
- Web Browser 110 for loading web pages such as a Web Page 214, which optionally includes code for executing a Client Application 112-*a* as an embedded application in Web Page 214, where Client Application 112-*a* sends requests to App Server 104, High-Volume Datastore 106 or Interface Datastore 107 and displays data received from App Server 104, High-Volume Datastore 106 or Interface Datastore 107;
- dedicated Client Application 112-*b* (e.g., a stand-alone email client) for sending requests to App Server 104, High-Volume Datastore 106 or Interface Datastore 107 and displaying data received from App Server 104, High-Volume Datastore 106 or Interface Datastore 107; and
- optionally, Data 216 such as cached search data (e.g., recently accessed search results, recent search queries, etc.), stored query cursors generated at Client 102 or received from App Server 104, High-Volume Datastore 106 or Interface Datastore 107 along with results from one or more prior queries.

Each of the above identified elements are, optionally, stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, Memory 206 optionally stores a subset of the modules and data structures identified above. Furthermore, Memory 206 optionally stores additional modules and data structures not described above.

Figure 3:
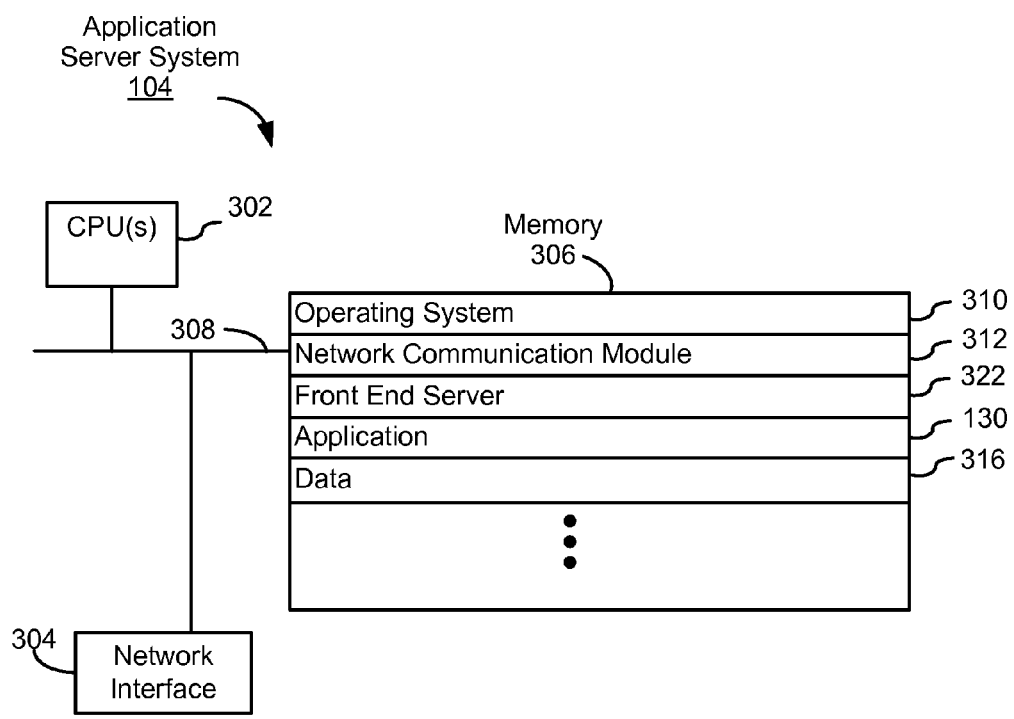
FIG. 3 is a block diagram illustrating an application server system, in accordance with some embodiments.

FIG. 3 is a block diagram illustrating an Application Server System 104 (also referred to herein as "App Server 104") in accordance with some embodiments. App Server 104 typically includes one or more processing units CPU(s) 302, one or more network or other Communications Interfaces 304, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

- Operating System 310 that includes procedures for handling various basic system services and for performing hardware dependent tasks;
- Network Communication Module (or instructions) 312 that is used for connecting App Server 104 to other computers (e.g., Client 102, High-Volume Datastore 106, and Interface Datastore 107) via one or more Network Interfaces 304 (wired or wireless) and one or more Communication Networks 102 (FIG. 1), such as the Internet, other wide area networks, local area networks, metropolitan area networks, and so on;
- Frontend Server 322 for coordinating communication between App Server 104, Clients 102, High-Volume Datastore 106 and Interface Datastore 107 and any other computer systems with which App Server 104 communicates;

Application 130 for communicating with High-Volume Datastore 106 and/or Interface Datastore 107 and serving as an intermediary backend application for a client application at Client 102; and optionally, Data 316 such as cached search data (e.g., recently accessed search results, recent search queries, etc.), stored query cursors generated at App Server 104 or received from Client 102, High-Volume Datastore 106 or Interface Datastore 107 along with results from one or more prior queries.

Each of the above identified elements are, optionally, stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows an "Application Server System" 104, FIG. 3 is intended more as functional description of the various features which are, optionally, present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement Application Server System 104 and how features are allocated among them will vary from one implementation to another, and optionally depends in part on the amount of data traffic that the system must handle during peak usage periods as well as during average usage periods.

Figure 4:
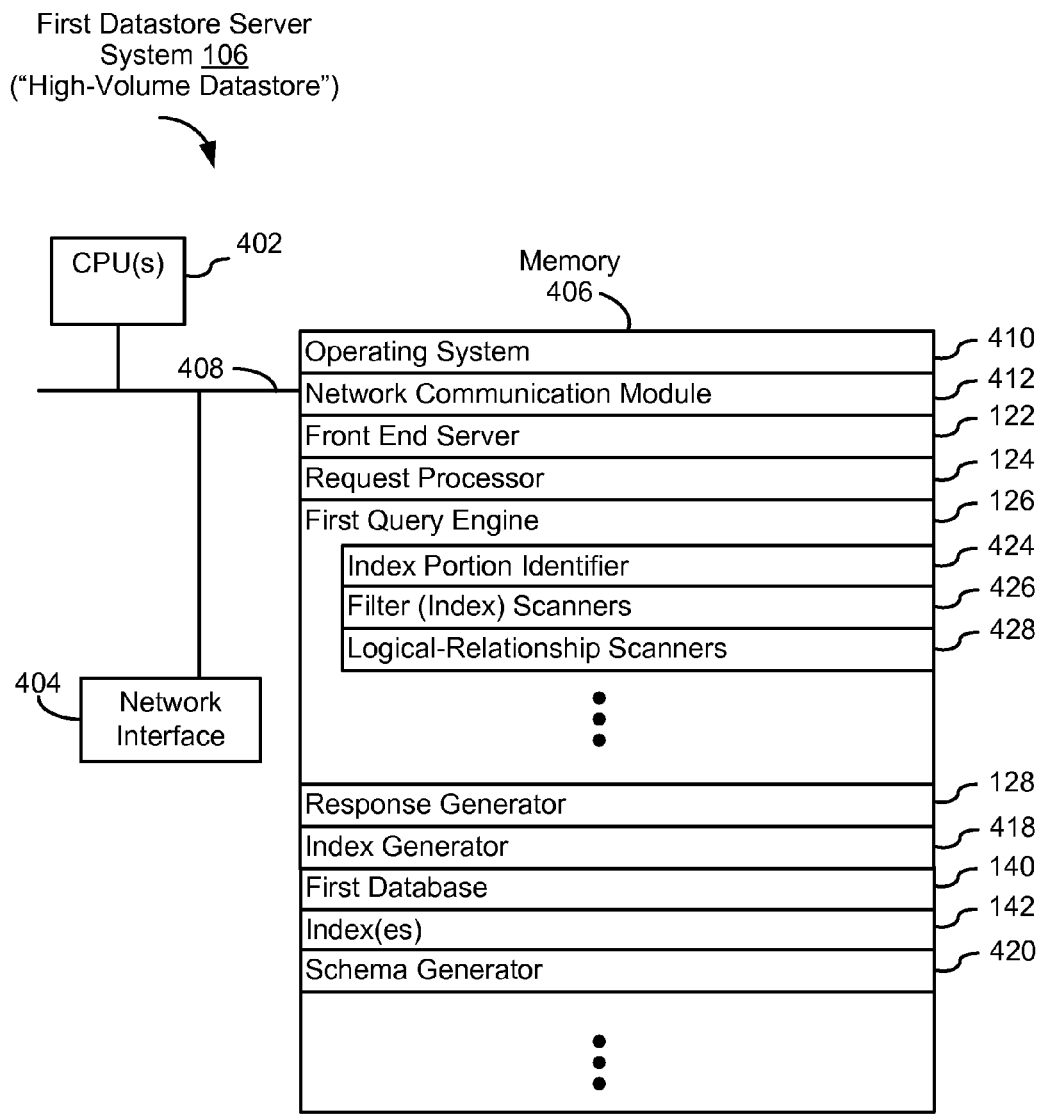
FIG. 4 is a block diagrams illustrating a first datastore server system (e.g., a "High-Volume Datastore"), in accordance with some embodiments.

FIG. 4 is a block diagram illustrating First Datastore Server System 106 (also referred to as "High-Volume Datastore 106") in accordance with some embodiments. High-Volume Datastore 106 typically includes one or more processing units CPU(s) 402, one or more network or other Communications Interfaces 404, Memory 406, and one or more Communication Buses 408 for interconnecting these components. Communication Buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

Operating System 410 that includes procedures for handling various basic system services and for performing hardware dependent tasks;

Network Communication Module (or instructions) 412 that is used for connecting High-Volume Datastore 106 to other computers (e.g., Client 102, App Server 104, and Interface Datastore 107) via one or more Network Interfaces 404 (wired or wireless) and one or more Communication Networks 102 (FIG. 1), such as the Internet, other wide area networks, local area networks, metropolitan area networks, and so on;

Frontend Server 122 for coordinating communication between High-Volume Datastore 106, Interface Datastore 107, App Server 104, Clients 102 and any other computer systems with which High-Volume Datastore 106 communicates;

Request Processor 124 for converting a query received from Client 102, App Server 104, or Interface Datastore 107 into a query to be executed by First Query Engine 126; for multi-step queries, the converting optionally includes revising the order and/or composition of the steps so as to improve the speed and/or efficiency of performing the query (e.g., by reducing the number of required index scans and/or performing steps that are likely to eliminate a large number of non-matching entities earlier in the search process);

First Query Engine 126 for performing the search query received from Client 102, App Server 104 or Second Database Server 107 by identifying index portions and searching the index portions using the search query, First Query Engine 126 optionally includes:

Index Portion Identifier 424 for identifying index portions that are adapted for responding to a search query (e.g., index portions that match all of the filters of a search query and are sorted in same sort order, such as a sort order specified by the search query);

one or more Filter (Index) Scanners 426 for scanning through an index or index portion to retrieve an identifier of one or more next matching results (e.g., matching index entries that are sequentially adjacent to the last matching index entry or query cursor position in the sort order) in the index or index portion;

one or more Logical-Relationship Scanners 428 for retrieving identifiers of matching entities from the index portions identified by Index Portion Identifier 424 in accordance with the received search query, the Logical-Relationship Scanners 428 (e.g., one or more of AND_Scanner, NOT_Scanner and OR_Scanner);

Response Generator 128 for organizing information concerning matching entities identified by First Query Engine 126 and generating display information to be transmitted to Client 102, where the display information specifies formatting of the search results at Client 102;

Index Generator 418 for generating indexes for use in executing search queries, in some implementations Index Generator 418 generates a large number of indexes (e.g., at least one index for each property that can be used to sort and/or filter search results) so that for each possible combination of filters and sort orders in a search query, there exists an index including an index portion where the index entries matching the combination of filters are arranged in a contiguous block of index entries sorted in the sort order. Alternatively or in addition, Index Generator 418 retrieves information about entities from a remote source such as a remote database or web crawler that systematically retrieves information from a plurality of remote sources (e.g., websites). These operations are typically performed by Index Generator 418 prior to receiving a search query at High-Volume Datastore 106. Performing these processes prior to receiving the search query increases the speed with which search results can be retrieved, thereby reducing latency of the search operation and returning results to users more quickly. In addition, Index Generator 418 typically continues to update Indexes 142 in between queries;

First Database 140 for storing entities or information about entities; First Database 140 is schemaless and operates according to a set of database processing capabilities (described in further detail with reference to FIG. 9F-9H below) such as, capabilities that enable First Database 140 to efficiently perform data operations (e.g., store and execute queries) against large sets of data including, for example a capability to retrieve data, where a computational cost to retrieve the data scales with a number of results retrieved rather than a number of entities stored in First Database 140 and a capability to store data distributed across a number of storage devices, where a subset of the data can be retrieved from one of the storage devices without accessing all of the storage devices across which the data is distributed;

one or more Indexes 142 which store information about entities and properties of the entities, typically the Indexes 142 are each sorted in accordance with values of the properties for the entities; and Schema Generator 420 for generating schemas (e.g., based on information stored in Index(es) 142) and providing the schema to First Query Engine 126, which in turn communicates the schema to Interface Datastore 107 for generating a schema-based database (e.g., Second Database 135) using a subset of the data in First Database 140.

Each of the above identified elements are, optionally, stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "First Datastore Server System" 106 (e.g., "High-Volume Datastore"), FIG. 4 is intended more as functional description of the various features which are, optionally, present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement High-Volume Datastore 106 and how features are allocated among them will vary from one implementation to another, and optionally depends in part on the amount of data traffic that the system must handle during peak usage periods as well as during average usage periods.

Figure 5:
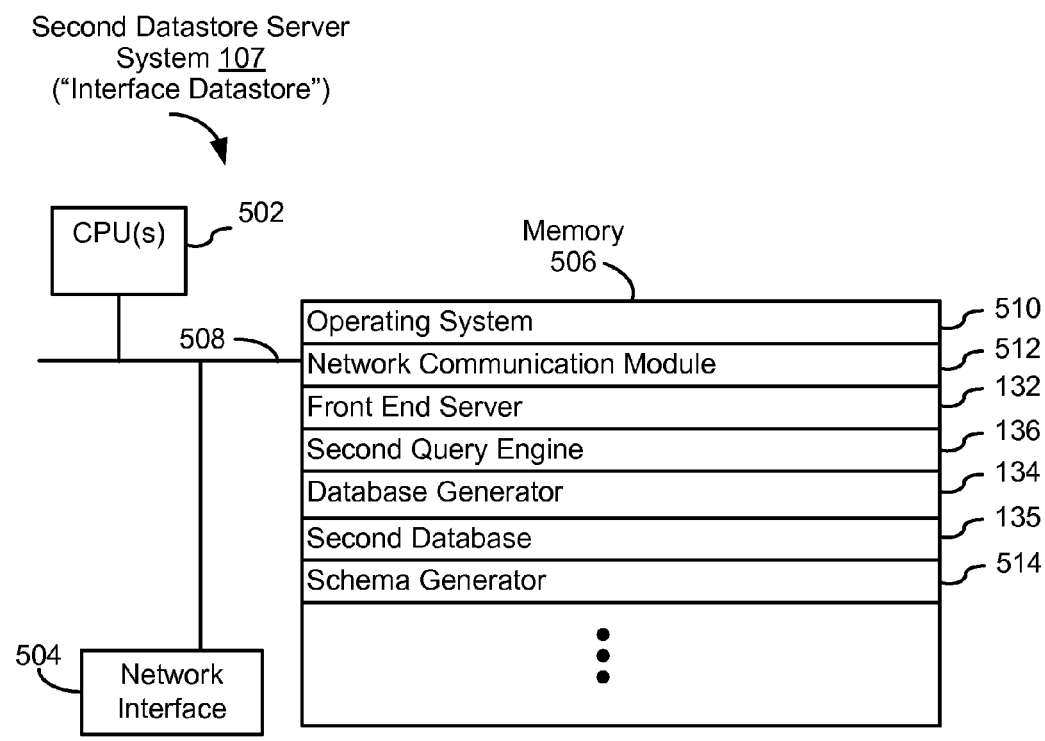
FIG. 5 is a block diagram illustrating a second datastore server system (e.g., an "Interface Datastore"), in accordance with some embodiments.

FIG. 5 is a block diagram illustrating Second Datastore Server System 107 (also referred to as "Interface Datastore 107") in accordance with some embodiments. Interface Datastore 107 typically includes one or more processing units CPU(s) 502, one or more network or other Communications Interfaces 504, Memory 506, and one or more Communication Buses 508 for interconnecting these components. Communication Buses 508 optionally include circuitry (sometimes called a chipset) that interconnects and controls communications between system components. Memory 506 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 506 optionally includes one or more storage devices remotely located from the CPU(s) 502. Memory 506, or alternatively the non-volatile memory device(s) within Memory 506, comprises a non-transitory computer readable storage medium. In some embodiments, Memory 506 or alternatively the non-transitory computer readable storage medium stores the following programs, modules and data structures, or a subset thereof:

Operating System 510 that includes procedures for handling various basic system services and for performing hardware dependent tasks;

Network Communication Module (or instructions) 512 that is used for connecting Interface Datastore 107 to other computers (e.g., Client 102, App Server 104, and High-Volume Datastore 106) via one or more Network Interfaces 504 (wired or wireless) and one or more Communication Networks 102 (FIG. 1), such as the Internet, other wide area networks, local area networks, metropolitan area networks, and so on;

Frontend Server 132 for coordinating communication between High-Volume Datastore 106, High-Volume Datastore 106, App Server 104, Clients 102 and any other computer systems with which Interface Datastore 107 communicates;

Second Query Engine 136 for optionally planning a query by selecting a sequence of steps to be performed on the data in Second Database 135. Second Query Engine 136 plans the query so as to improve the performance characteristics of the query, and Second Query Engine 136 performs the search query on Second Database 135 to identify search results. Second Query Engine 136 transmits the search results to Frontend Server 132, which in turn transmits the results to Client 102 or App Server 104;

Database Generator 134 for retrieving data (e.g., entities and information about database schema) from High-Volume Datastore 106 (Frontend Server 122) and for generating Second Database 135;

Second Database 135 for storing entities and/or information about entities (e.g., information about database schema); Second Database 135 is optionally generated prior to receiving a query from Client 102 or App Server 105, or in response to a received query. Second Database 135 has an associated schema and, in some situations, a predefined size limit; Second Database 135 is optionally a relational database and operates in accordance with database processing capabilities (described in greater detail with reference to FIG. 9F-9H), such as capabilities to process support query-syntaxes that are not supported by First Database 140; to combine entities from a plurality of different tables of the second database in accordance with criteria specified in the query; and to search within content of one or more entities in accordance with one or more query terms provided in the query; and optionally, Schema Generator 514 for generating a database schema (absent a schema provided by High-Volume Datastore 106 along with the entities) based on the data retrieved from a schemaless database (e.g., First Database 140) stored at High-Volume Datastore 106.

Each of the above identified elements are, optionally, stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, Memory 506 optionally stores a subset of the modules and data structures identified above. Furthermore, Memory 506 optionally stores additional modules and data structures not described above.

Although FIG. 5 shows "Second Datastore Server System" 107 (e.g., "Interface Datastore 107), FIG. 5 is intended more as functional description of the various features which are, optionally, present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement Interface Datastore 107 and how features are allocated among them will vary from one implementation to another, and optionally depends in part on the amount of data traffic that the system must handle during peak usage periods as well as during average usage periods.

Entities, Indexes and Empirically-Determined Schema

Figure 6B:
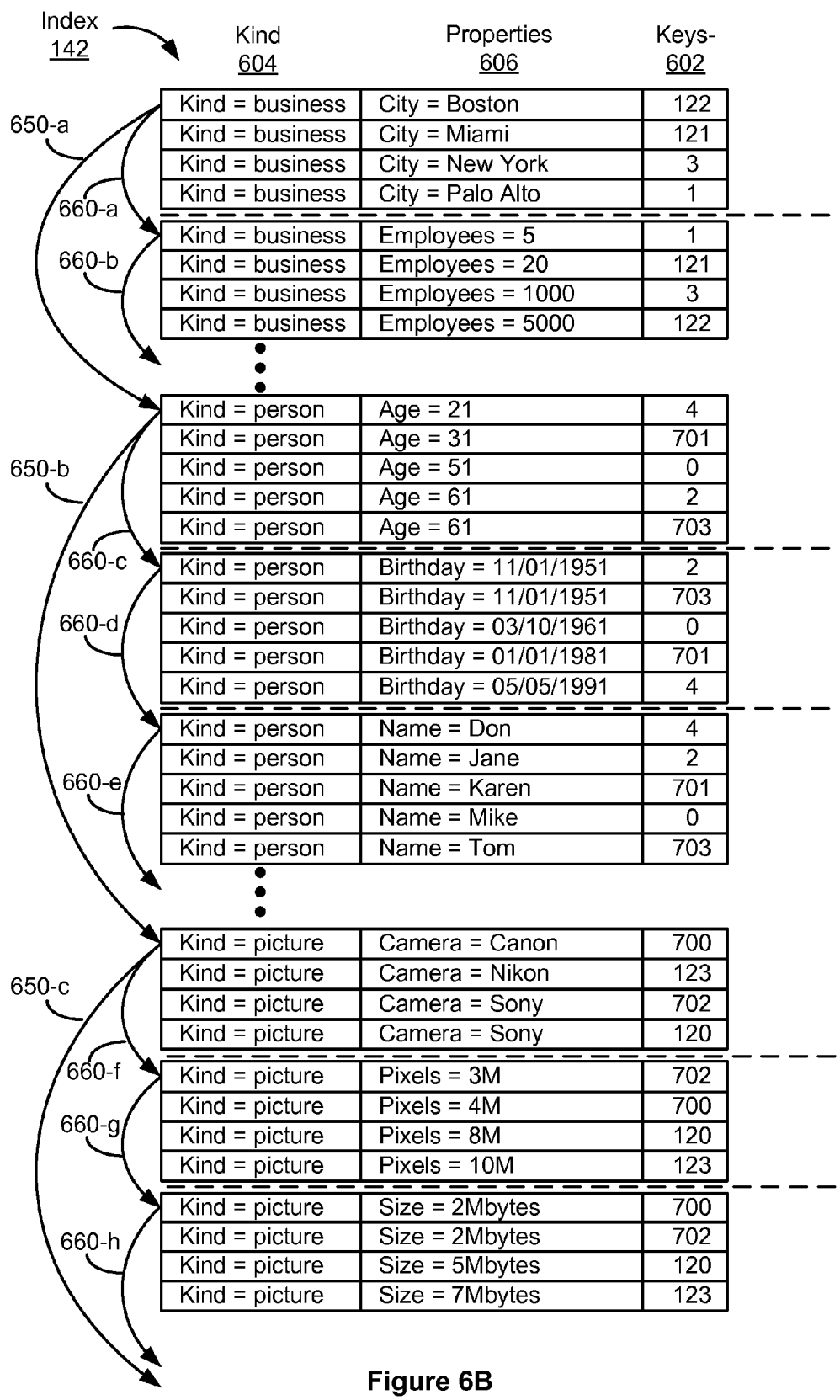
FIG. 6B is a block diagram illustrating an index including index entries for entities stored in an entity database in the High-Volume Datastore, in accordance with some embodiments.
Figure 6C:
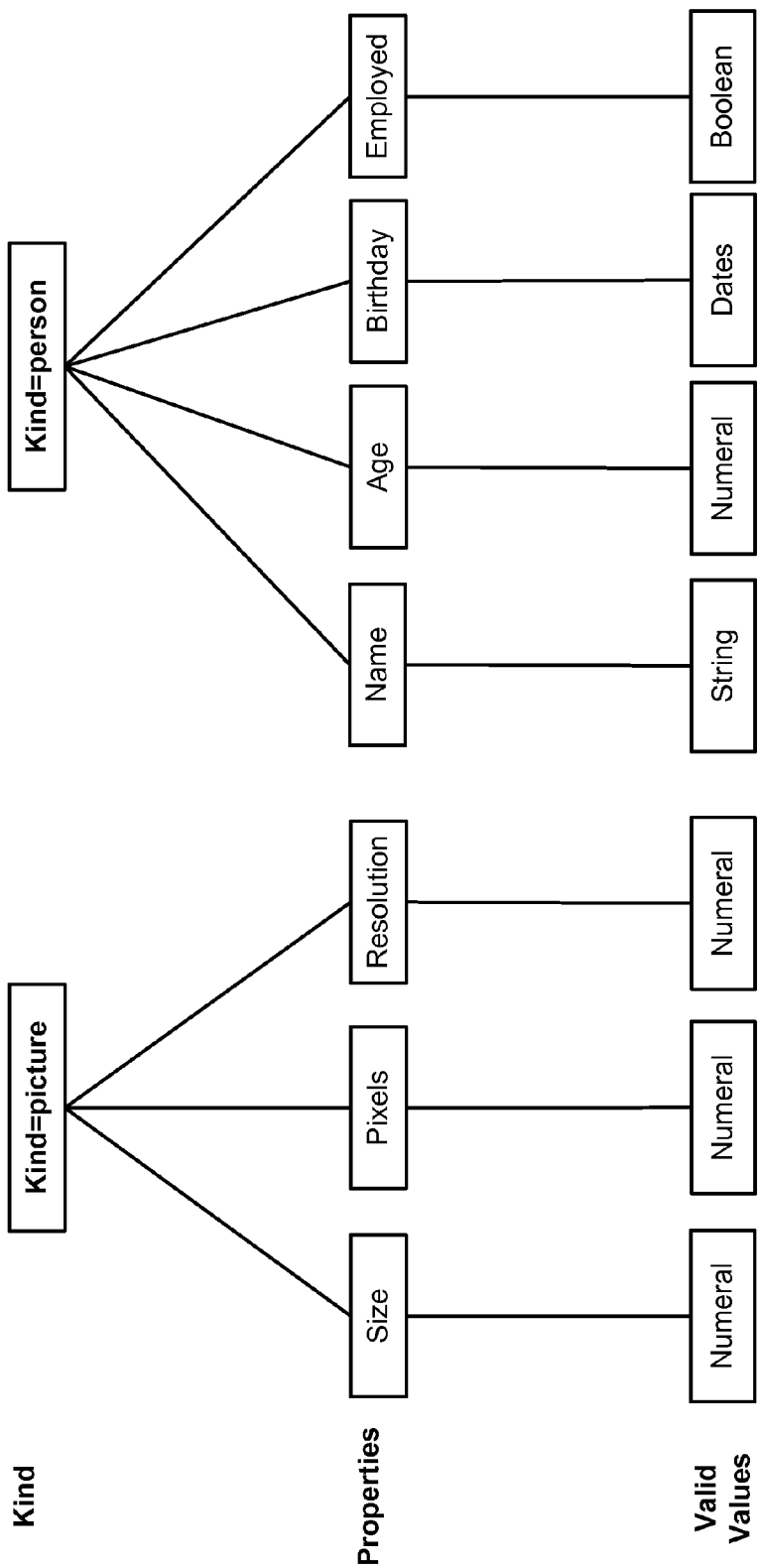
FIG. 6C is a block diagram illustrating a database schema for an entity database, in accordance with some embodiments.

FIGS. 6A, 6B and 6C, respectively, illustrate an entity database (First Database 140, FIG. 6A), an index (Index 142, FIG. 6B) generated from the entity database, and examples of empirically-determined schema (FIG. 6C) generated from the index (Index 142). A database schema defines the structure of the database and the relationships between data in the database. Database schemas are used in many database functions that enable searching, organizing, sorting, and navigating databases. In order to provide flexibility to perform such database functions, it is advantageous to have access to a database schema. In the event of a database being schemaless (e.g., First Database 140, FIG. 6A), it is beneficial to be able to generate a schema for the schemaless database. Furthermore, if and when data stored in the schemaless database varies over time, previously generated schemas become outdated. As a result, a method (as described with reference to FIGS. 6B and 6C below) for efficiently generating an empirically-determined schema for use in performing search queries against the schemaless database (e.g., First Database 140 in FIG. 6A) or for use in generating a schema-based database (e.g., Second Database 135 in FIG. 1) using data from the schemaless database is beneficial.

Accordingly, FIG. 6A illustrates an entity database including information about entities stored in a datastore server system, in accordance with some embodiments. Entity Database 140 shown in FIG. 6A stores information about entities (data objects) having Keys 602 (unique identifiers), and components having component types such as Kinds 604, and Properties 606. In some embodiments, an entity has a set of metadata including a kind and one or more properties, each property having one or more possible values. In some implementations, a plurality of the entities each have a single kind. In some implementations, at least some of the kinds are associated with one or more properties. Possible values of properties can include either specific valid values that have been stored in Entity Database 140 for a particular property (e.g., "hazel," "brown," "blue" or "green" for an "Eye Color" property) or specific types of values that are valid (e.g., integers, floating point values, strings, dates, Boolean values and/or binary data). In other embodiments there are properties that are not associated with any particular kind or are associated with multiple kinds. As one example, in some circumstances, both a person and a business have a "name" property that can be any string of characters.

In the example shown in FIG. 6A, Entity 0 has Key=0, Kind="person" and Properties "name," "age," and "birthday" which have property values corresponding to "Mike," "51," and "Mar. 10, 1961" respectively. Similarly, Entity 122 has Key=122, Kind="business" and Properties "city" and "employees" with property values "Boston" and "5000" respectively. A property with multiple values can have values of mixed types (e.g., for a particular entity, a property could have one value that is an integer and another value that is a string). It should be understood that the metadata described above (e.g., the Kinds, Properties and values) can be used either as predefined sort parameters or to determine whether respective entities meet filter criteria based on the metadata when searching for entities in Entity Database 140.

In some embodiments, each entity has a key that uniquely identifies the entity, also called a "unique identifier" for the entity. In some implementations, a key is simply an Entity ID that is associated with the entity (e.g., an Entity ID assigned by High-Volume Datastore 106). In other implementations, the key includes a kind and the Entity ID. The kind categorizes the entity so that it can more easily be identified and retrieved. Additionally, in some embodiments, a key uniquely identifies an entity for a particular application (e.g., Application 130 in FIG. 1 and FIG. 3). Thus, in some implementations an application identifier (e.g., an identifier of Application 130 in FIG. 1 and FIG. 3) and, optionally, a namespace identifier (e.g., an identifier of a namespace or other logical division of data for Application 130 in FIG. 1 and FIG. 3) are used in addition to the key to uniquely identify an entity in First Database 140.

In some embodiments, an entity is requested by Client 102 or App Server 104 either by submitting a request for an entity associated with a particular key, or by requesting performance of a search query for entities that match a specified component type (Kind or Property) and value. For example, in the case of First Database 140 shown in FIG. 6A, a search request for all entities with Kind="business" will result in Entity 1, Entity 3, Entity 121 and Entity 122 (from among the entities listed in First Database 140 in FIG. 6A). Execution of a search query for entities that match one or more specified properties and/or values will typically first produce the key for a matching entity using Index(es) 142 and then retrieve the matching entity or information representative of the matching entity from First Database 140. In some implementations, First Database 140 is a schemaless database that does not require that all entities of a given kind have the same properties, as there is no predefined schema that specifies a predefined set of valid properties for respective kinds of entities.

FIG. 6B illustrates an example of an index (e.g., Index 142) generated from First Database 140 (of FIG. 6A). As shown in FIG. 6B, Index 142 includes a plurality of index entries (rows) sorted in accordance with Kind 604, Properties 606, Property Values and Key 602, in that order. In other words, Index 142 is obtained by sorting the index entries by their kinds, and within respective kinds sorting the index entries by their properties, and within respective properties sorting the index entries by their property values, and within respective property values sorting the index entries by their keys. There is an index entry for each value of a property of an entity. In the example shown in FIG. 6B, respective index entries include a single property value for a respective entity, thus, if a particular entity has a multi-valued property, there will be at least two index entries for the entity (e.g., two index entries in the same index with the same key but different filter values), one sorted in accordance with the first value of the property and another sorted in accordance with the second value of the property. Additionally, where an entity has multiple properties, the entity has multiple corresponding index entries in different portions of Index 142, for example Entity 4 has an index entry for "Name=Don" and an index entry for "Birthday=May 5, 1991."

For purpose of illustration, in Index 142 in FIG. 6B, index entries corresponding to Kind="business" are placed contiguously together in a cluster (sometimes called an "index portion") or have consecutive positions and arranged ahead of all contiguously arranged index entries corresponding to Kind="person" which are in turn followed by contiguously arranged index entries with Kind="picture." Similarly, among the cluster of index entries with Kind="business," the index entries are arranged alphabetically with respect to Properties; the index entries with Property="city" are clustered and appear ahead of the cluster of index entries with Property="employees." Within the cluster of index entries having Property="city," the index entries are further sorted by property values (in this case, strings), arranged alphabetically. In the event of two index entries in the index having identical kinds, properties and property values, the index entries are numerically arranged by ascending order of their keys. In this example, two index entries have Kind="person," Property="age," and Property Value="61." These two index entries are further arranged by the numerical values of their keys; the entry with key=2 appears ahead of the entry with key=703 in Index 142. In some implementations, as new entities are added to First Database 140, new index entries are created in Index 142, and are placed in appropriate locations in accordance with the sort order of Index 142. While Index 142 has been described as being sorted in a particular sort order for the purposes of illustration, it should be understood that many other possible sort orders would provide similar advantages to those described herein.

The information (e.g., kind, property type and property value information) included in the index entries, and the sorting of Index 142 in accordance with this information (one example of which is shown in FIG. 6B) enables an empirically-determined schema to be generated quickly and efficiently by traversing at least a portion of Index 142. In some embodiments, traversing Index 142 includes skipping (650, 660) one or more index entries in accordance with a sort order of Index 142 (e.g., a monotonic ordering scheme for ordering the index entries). In some implementations, the skipping (650, 660) includes skipping consecutive index entries that share a common component value (common Kind value and/or common Property value). The arrows in the index are illustrative of skipping consecutive index entries that occur within a cluster of a common kind or skipping consecutive index entries that occur within a cluster of a common property. This example is merely illustrative of traversing an index generated from an entity database, according some embodiments. In some embodiments, the schema is generated by traversing a same index multiple times (e.g., traversing the index a first time by skipping 650 through the index to identify valid kinds and traversing the index a second time by skipping 660 through the index to identify properties associated with the kinds). Alternatively, in some embodiments, the schema is generated by traversing through a first index that is sorted by kinds to identify valid kinds for the database and traversing a second index that is sorted by properties to identify valid properties for the database. It should be understood that additional traversals of the index are, optionally, performed to determine valid values for the identified properties.

In the following description, the symbol > stands for "greater than" in accordance with a predefined ordering, such as a numerical or alphabetical ordering. As shown in FIG. 6B, High-Volume Datastore 106 (or Schema Generator 420) traverses Index 142 to determine valid kinds for an empirically-determined schema by identifying a first index entry with a first kind (e.g., Kind="business") and then skips (650-a) to a next index entry with a Kind > the first kind. As shown in FIG. 6B, Schema Generator 420 skips to a first index entry with a second kind (e.g., Kind="person"). Subsequently, High-Volume Datastore 106 (or Schema Generator 420) skips (650-b) from the first index entry with the second kind (e.g., Kind="person") to a next index entry with a Kind > the second kind. As shown in FIG. 6B, Schema Generator 420 skips to a first index entry with a third kind (e.g., Kind="picture"). In some implementations, High-Volume Datastore 106 (or Schema Generator 420) continues to skip (e.g., 650-c) through the index until an end of the index is reached or an end of an index portion matching filter criteria (e.g., "generate a schema for all kinds with values starting with letters between A and N") is reached. In some embodiments, where the index entries are sorted alphabetically by kind, the skipping is accomplished by searching for a next index entry with a kind=(current kind)+(null character), where the null character (sometimes represented as ^0) is the first character in the alphabetical sort order, which finds the next index entry that has a kind greater than the current kind in the alphabetical sort order. As valid kinds are identified, they are added to an empirically-determined schema for the entity database.

Similarly High-Volume Datastore 106 (or Schema Generator 420 in FIG. 4) traverses Index 142 to determine valid properties for an empirically-determined schema by, for each of a plurality of respective kinds, identifying a first index entry in a portion of Index 142 corresponding to the respective kind (e.g., Kind=person) with a first property (e.g., Property="age") and then skips (660-c) to a next index entry with a Property > the first property. As shown in FIG. 6B, Schema Generator 420 skips to a first index entry with a second property (e.g., Property="birthday"). Subsequently, High-Volume Datastore 106 (or Schema Generator 420) skips (660-d) from the first index entry with the second property (e.g., Kind="birthday") to a next index entry with a Property > the second property. As shown in FIG. 6B, Schema Generator 420 skips to a first index entry with a third property (e.g., Property="name"). In some implementations, High-Volume Datastore 106 (or Schema Generator 420) continues to skip (e.g., 660-e) through the index portion corresponding to the respective kind until an end of the index portion corresponding to the respective kind is reached and performs a similar operation for a next index portion corresponding to a next identified kind. As the valid properties for respective kinds are identified, they are added to an empirically-determined schema for the entity database. Similar steps are optionally followed to identify valid values and/or valid value types for respective properties. Additionally, in some embodiments properties and/or valid values for properties are identified using a different index that is sorted by property rather than by kind.

In some embodiments, Index 142 is too large to be stored on a single storage device (e.g., database servers, hard drives, flash drives etc.) and thus is distributed across multiple different storage devices. Thus, in situations where a particular kind or property corresponds to a large number of index entries that span multiple storage devices (e.g., the portion for Kind="person" is stored on multiple database servers), traversing Index 142 by skipping over all of the index entries for entities where Kind="person" other than the first index entry where Kind="person" enables an empirically-determined schema to be generated without accessing one or more of the multiple storage devices spanned by index entities corresponding to the particular kind Generating an empirically-determined schema without accessing one or more of the storage devices on which the index is stored improves performance of the overall system by reducing processing load on the skipped storage device(s) as well as increasing speed of generating the empirically-determined schema by avoiding the time associated with accessing the skipped storage device(s).

FIG. 6C illustrates an example schema generated from Index 142. The schema is arranged such that the one or more kinds have one or more corresponding properties and the properties in turn have one or more valid property values (e.g., integers, floating point values, strings, dates, and binary data). In some embodiments, the schema (as illustrated by the examples in FIG. 6C) is generated based on index entries for entities stored in the schemaless database such as First Database 140 shown in FIG. 6A. Thus, the example schema in FIG. 6C shows that for entities with Kind="picture", there are at least three valid properties (e.g., size, pixels and resolution, each of which has a numeric value), while for entities with Kind="person" there are at least four valid properties (e.g., name with valid values that are strings, age with valid values that are numeric, birthday with valid values that are dates, and employment status with valid values that are Boolean values). In some embodiments, the schema is generated by traversing at least a portion of the index (e.g., as described above with reference to FIG. 6B).

In some implementations, the schema shown in FIG. 6C, or a portion thereof, is transmitted to App Server 104 or Client 102 for use in preparing information for display to an end-user. For example, the schema can be used to determine fields to display in a new contact entry (e.g., a name field, an age field, a birthday field, and an employment status selector with the options True/False). As another example, the schema can be used to provide options for sorting (e.g., "sort all results by birthday") search results or restricting searches (e.g., return only entities that correspond to people with ages between 18 and 35). It should be noted that, as entities are added to, deleted from and modified in First Database 140, corresponding index entries will be added to, deleted from and modified in Index 142 and the schema shown in FIG. 6C will change, from time to time, in accordance with changes to the entity database. For example, if a user were to delete all entities corresponding to people who have an employment status entered, the employment status branch of the schema would not exist in a subsequently generated empirically-determined schema, as "Employed" would not be identified as a valid property of Kind="person." Similarly, if a user were to modify one or more of the entities corresponding to people so as to include an eye color in those entities (in the entity database), "eye color" would be included as a valid property of Kind="person" in a subsequently generated empirically-determined schema for the entity database.

In some embodiments, the empirically-determined schema shown in FIG. 6C, or a portion thereof, is transmitted from High-Volume Datastore 106 to Interface Datastore 107 for use in generating Second Database 135 from corresponding data retrieved from First Database 140 (as explained in greater detail below with reference to method 900 and FIGS. 7C, 9A-9H).

Figure 7A:
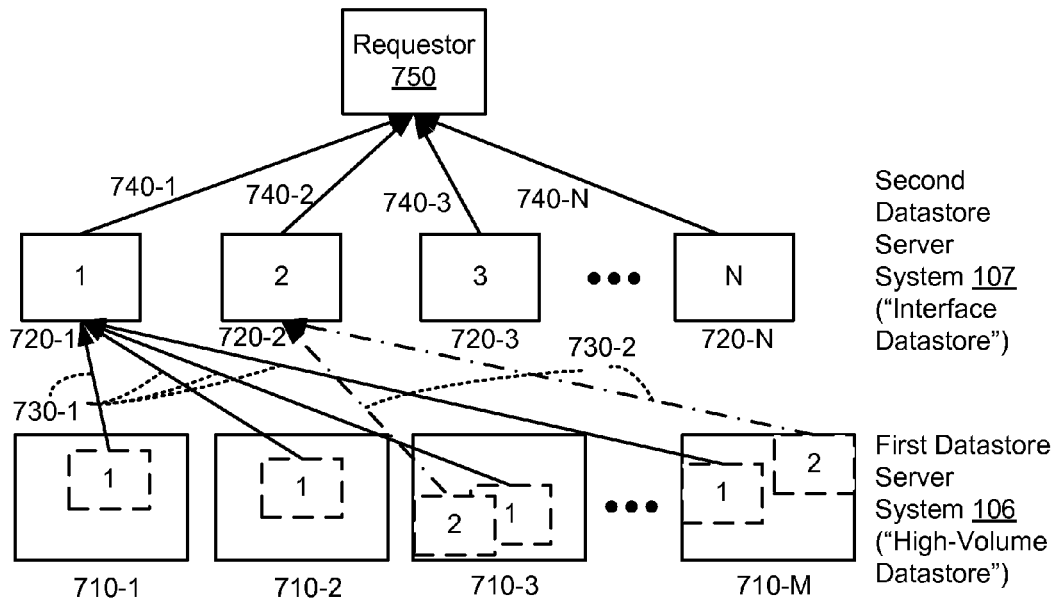
FIGS. 7A-7B are block diagrams illustrating sharding of data at the High-Volume Datastore and/or the Interface Datastore, in accordance with some embodiments.
Figure 7B:
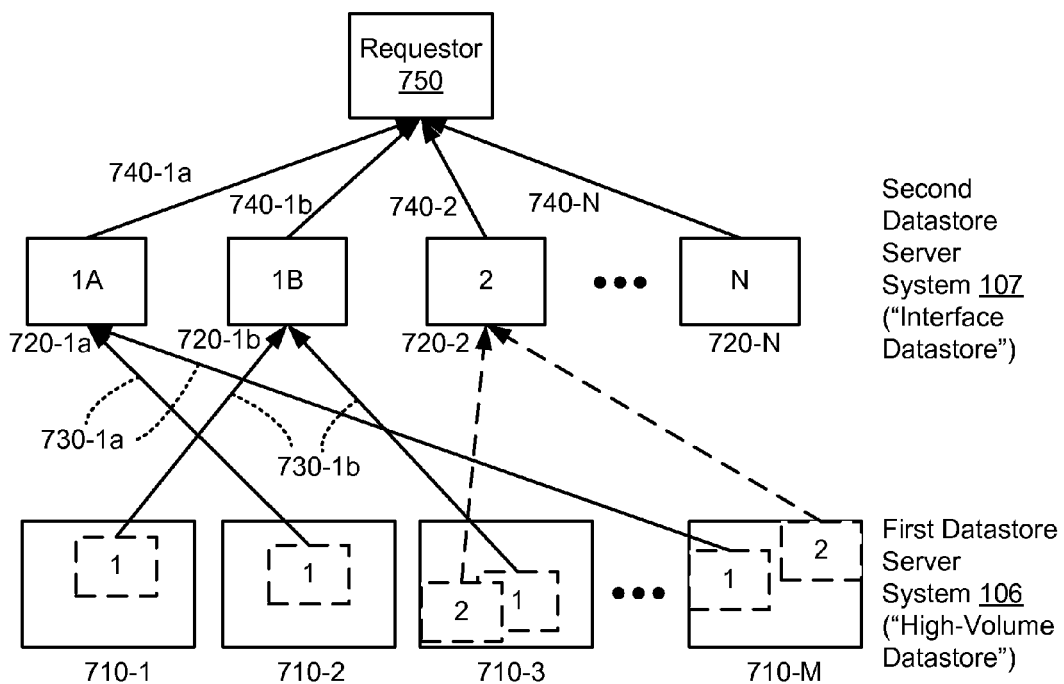

Generation of A Second (Schema-Based) Database from A First (Schemaless) Database FIGS. 7A-7B are block diagrams illustrating sharding of data at the first datastore server system (e.g., the "High-Volume Datastore") and/or the second datastore server system (e.g., the "Interface Datastore"), in accordance with some embodiments. The data retrieved from High-Volume Datastore 106 is used to generate Second Database 135 at Interface Datastore 107.

In some implementations, data in First Database 140 is sharded by dividing subsets of data in First Database 140 between a number of different Storage Devices 710, such as over multiple independent hard disk drives, optical, magnetic, flash and/or solid state memory storage devices configured to operate in conjunction with multiple independent processors (e.g., processors used in desktop computers and/or servers). Sharding data in First Database 140 helps to balance the load of read/write requests on the storage devices that are used to store the data in First Database 140. In some embodiments where First Database 140 is sharded, as shown in FIGS. 7A and 7B, Interface Datastore 107 collects data from different Storage Devices 710 of High-Volume Datastore 106 and collects the data from those different storage devices into a database "view."

In some embodiments, Interface Datastore 107 stores a plurality of different databases in different Storage Devices 720, where the different databases correspond to different "views" of data stored at High-Volume Datastore 106. These different views stored at Interface Datastore 107 correspond to different subsets of the data in First Database 140 that are arranged in different ways. For example, a first "view" is a relational database adapted to perform SQL operations, whereas a second "view" is a database adapted to perform geo-spatial queries. As such, the first and second "views" of data at Interface Datastore 107 are views of the same schemaless database that are adapted or optimized to be suited for two different types of queries. In some embodiments, the different "views" use different data from High-Volume Datastore 106. In some embodiments, two or more of the different "views" include overlapping data from High-Volume Datastore 106 (e.g., at least some of the data in each of the two or more different "views" includes a set of shared data).

In some situations, a database "view" that includes data from a plurality of different Storage Devices 710 of High-Volume Datastore 106 is collected into a smaller number of Storage Devices 720 of Interface Datastore 107. For example in FIG. 7A, data from Storage Devices 710-1, 710-2, 710-3 and 710-M is collected into a database "view" (e.g., Second Database 135 in FIG. 1) at a single Storage Device 720-1 of Interface Datastore 107. As another example in FIG. 7B, data from Storage Devices 710-1, 710-2, 710-3 and 710-M is collected into a database "view" (e.g., Second Database 135 in FIG. 1) that is split between two different Storage Devices 720-1b and 720-1b of Interface Datastore 107. An advantage of aggregating data that was sharded at High-Volume Datastore 106 into a smaller number of storage devices at Interface Datastore 107 is that a Requestor 750 (e.g., Client 102 or App Server 104) can request relevant data from Interface Datastore 107 without communicating with all of the different shards of High-Volume Datastore that include subsets of the information in the "view" stored at Interface Datastore 107.

Figure 9A:
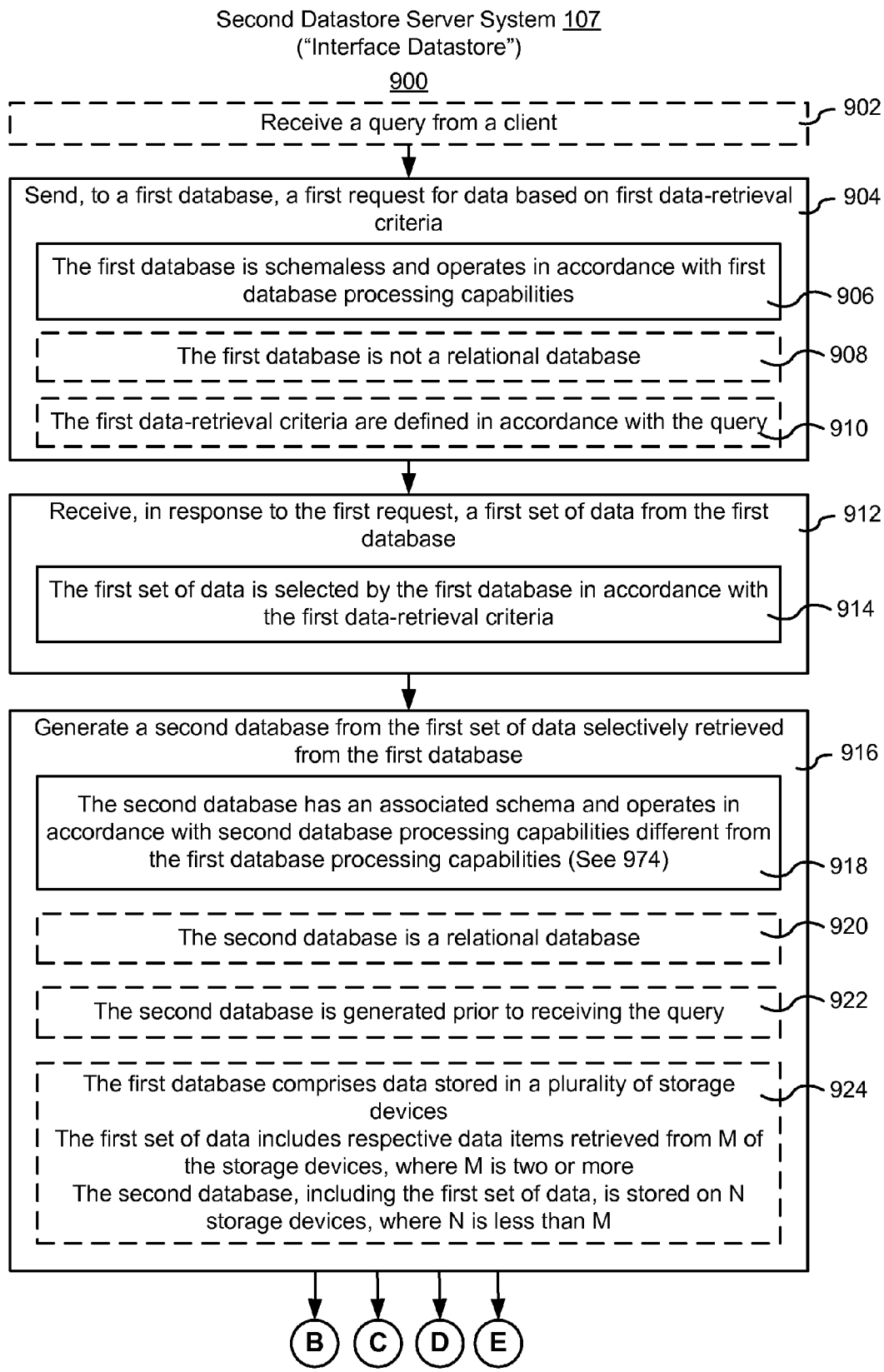
FIGS. 9A-9H include a flow chart illustrating a method for generating the second database and processing queries at the Interface Datastore using the second database, in accordance with some embodiments.
Figure 9B:
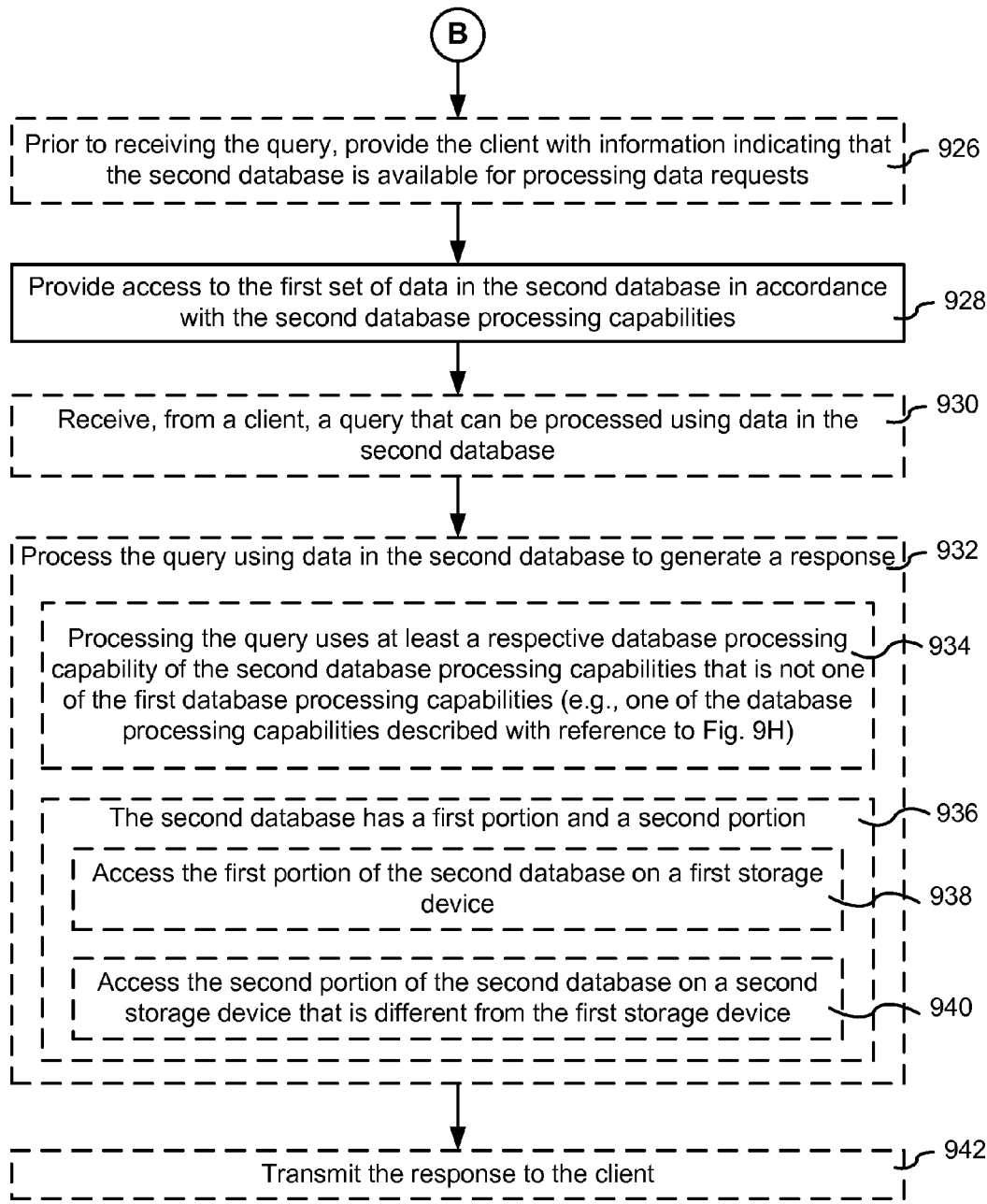
Figure 9C:
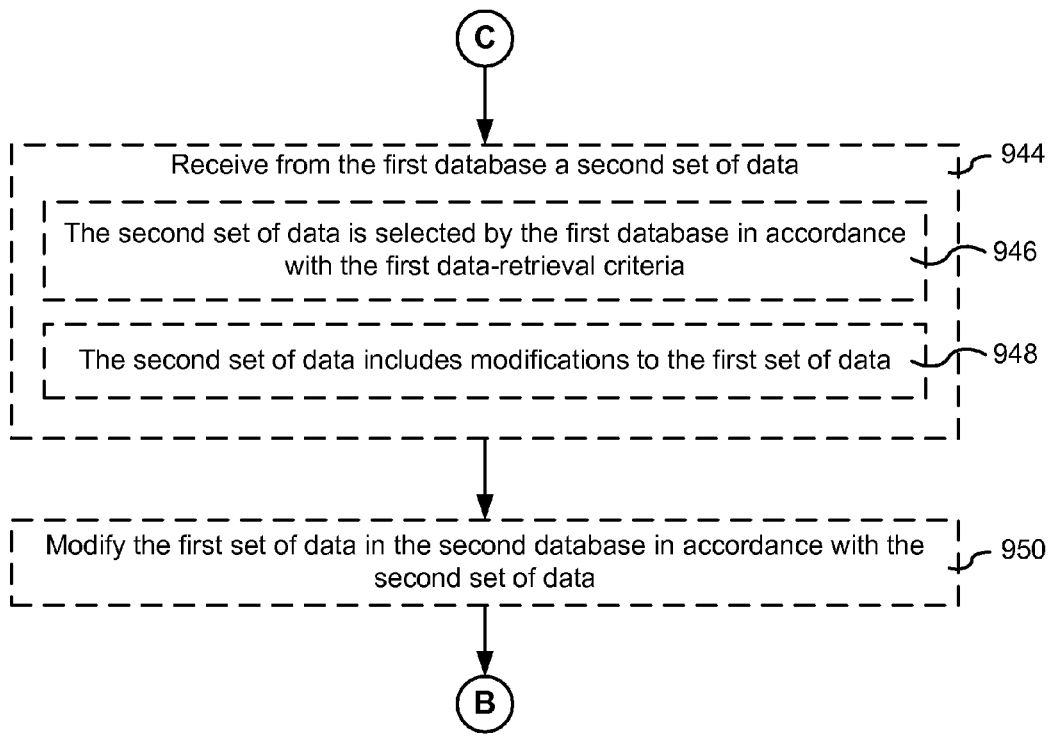
Figure 9D:
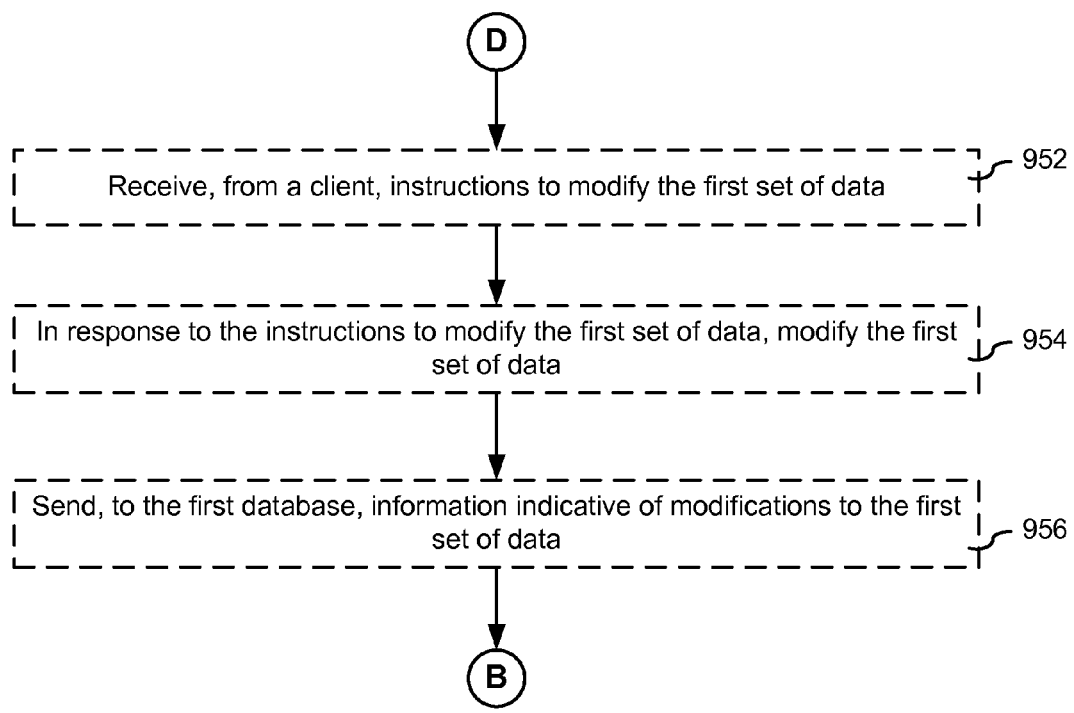
Figure 9E:
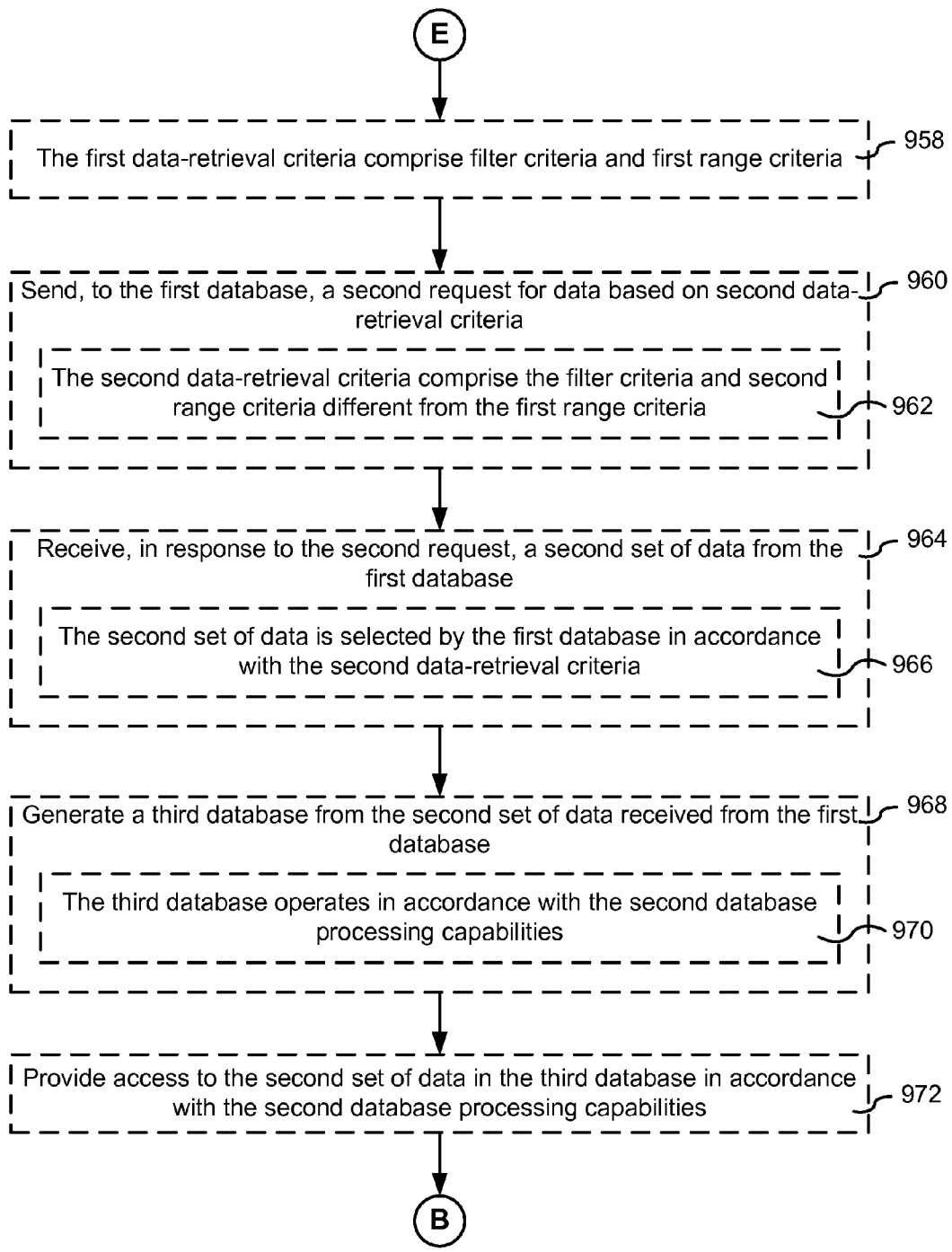
Figure 9F:
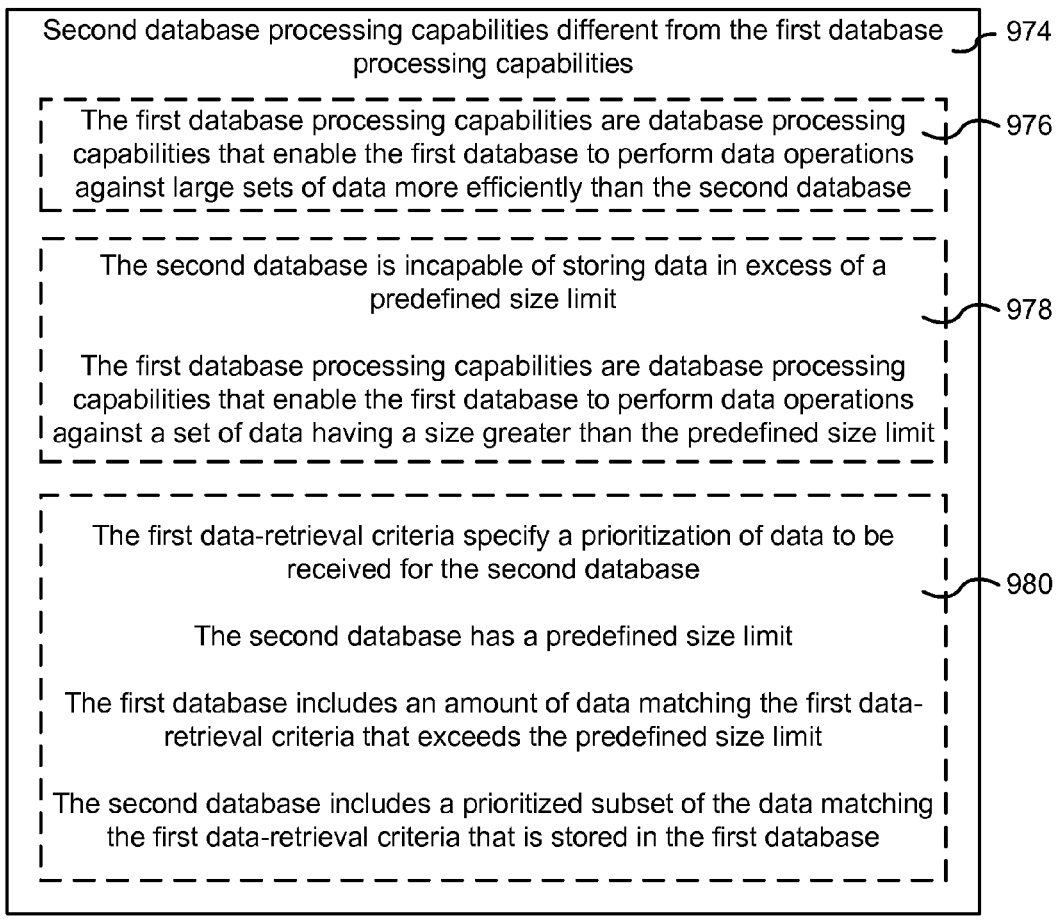
Figure 9G:
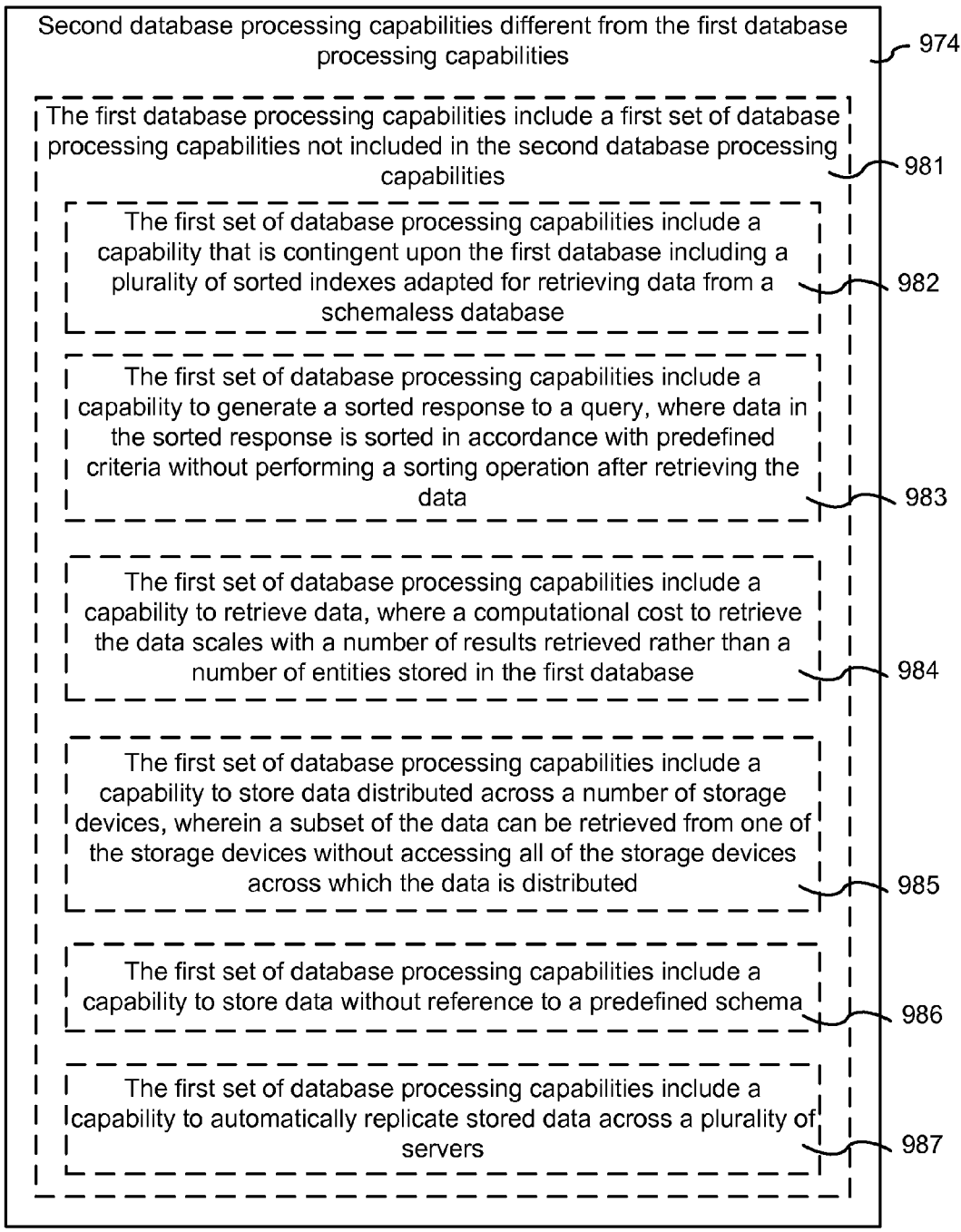
Figure 9H:
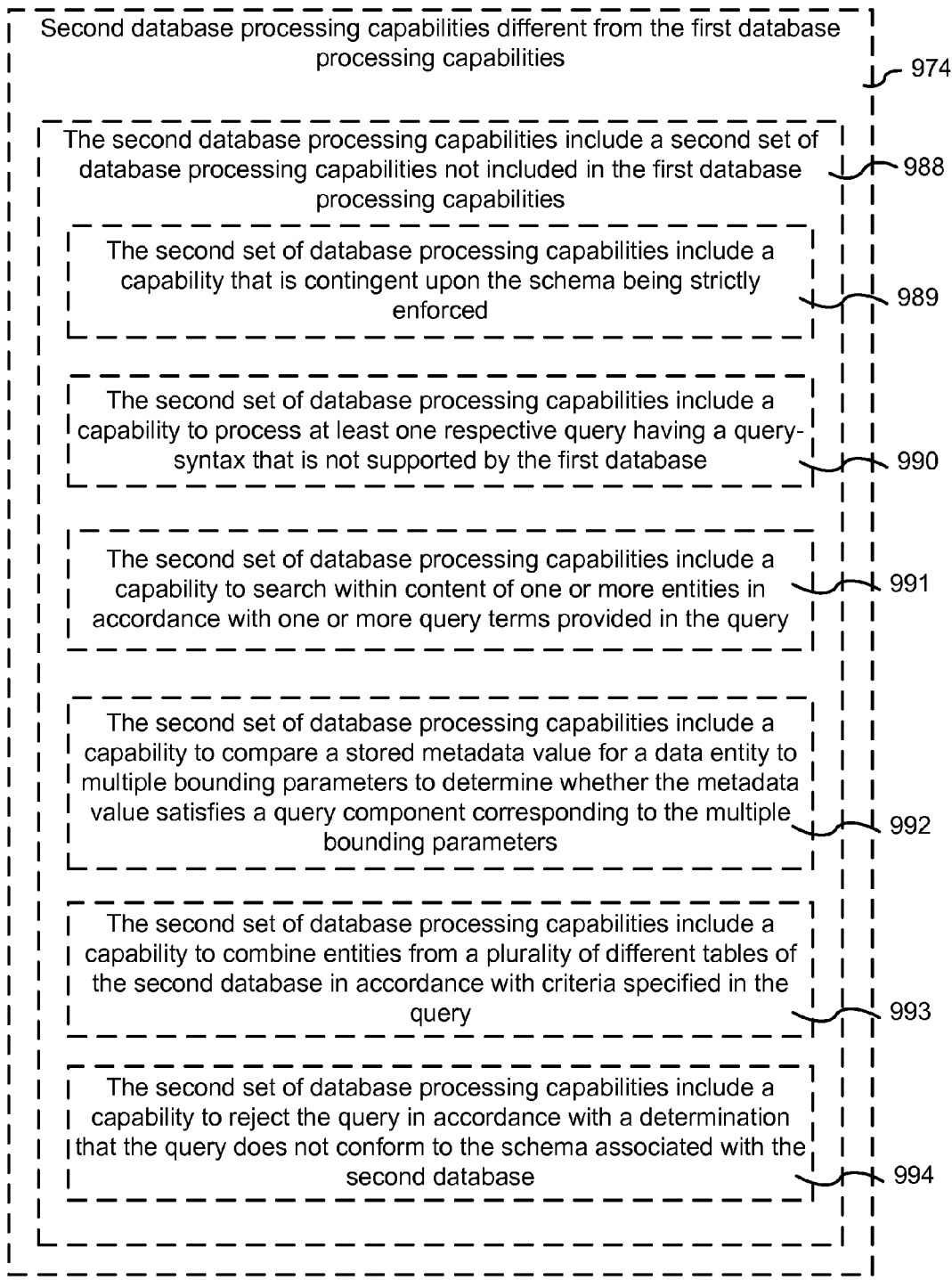

Data for the "views" described above are selected from First Database 140 in accordance with predefined (e.g., first) data-retrieval criteria (e.g., filter criteria, as explained in greater detail with reference to FIGS. 9A and 9E below). The data is transmitted (730) from Storage Devices 710 storing First Database 140 (at High-Volume Datastore 106) to Storage Devices 720 of Interface Datastore 107 and used to generate a second database (e.g., Second Database 135). In some embodiments, Second Database 135 has an associated schema and operates in accordance with second database processing capabilities different from first database processing capabilities of First Database 140 (as described in further detail with reference to FIG. 9F-9H). In some embodiments, the datasets include data items retrieved from M of the storage devices (e.g., in FIG. 7A, data stored in Storage Device 720-1 at Interface Datastore 107 is retrieved from 710-1, 710-2, 710-3, ..., 710-M) at High-Volume Datastore 106, where M is two or more. In some embodiments, as shown in FIG. 7A, Second Database 135, including the datasets obtained from First Database 140, is stored on a smaller number of Storage Devices (e.g., 720-1 in FIG. 7A and 720-1a and 720-1b in FIG. 7B).

As described above, in some embodiments, the data in First Database 140 is sharded to reduce load on the storage devices and to accommodate large volumes of data that would exceed the storage limit of any individual storage device. Additionally, High-Volume Datastore 106 optionally stores replicas of data across multiple servers (or storage devices). In some embodiments, Interface Datastore 107 obtains (e.g., retrieves) a subset of the data from one or more of the storage devices of High-Volume Datastore 106 without accessing all of the storage devices across which data in First Database 140 is distributed. For example, in FIG. 7A, Storage Device 720-2 of Interface Datastore 107 stores a "view" of First Database 140 that was obtained (730-2) from Storage Device 710-3 and Storage Device 710-M of High-Volume Datastore 106 without accessing Storage Device 710-1 and Storage Device 710-2 of High-Volume Datastore 106.

FIG. 7B illustrates an example, similar to the example shown in FIG. 7A, where "views" of data are generated at Interface Datastore 107 based on data obtained from High-Volume Datastore 106. In FIG. 7B, the data at Interface Datastore 107 is used to execute queries received from Requestor 750. Data (e.g., results generated by the execution of the query at Interface Datastore 107) is transmitted (740) from Interface Datastore 107 to Client(s) in response to the query, as described above for FIG. 7A.

A distinction between the examples shown in FIG. 7B and FIG. 7A is that in FIG. 7A, a set of retrieved data (or "views") of the retrieved data) obtained from High-Volume Datastore 106 used to generate Second Database 135 is stored at a single storage device. For example, in FIG. 7A, a single device 710-1 stores the first set of data or "views" of the first set of data obtained (730-1) at Interface Datastore 107 from High-Volume Datastore 106. In contrast, in FIG. 7B, the first set of retrieved data is distributed (or "sharded") over two storage devices (710-1a and 710-1b). In the example shown in FIG. 7B, Storage Devices 720-1a and 720-1b (at Interface Datastore 107) obtain (730-1a and 730-1b, respectively) different data from storage devices (at High-Volume Datastore 106). For example, device 720-1a (at Interface Datastore 107) obtains (730-1a) data from Storage Devices 710-2 and 710-M (at High-Volume Datastore 106), while Storage Device 720-1b (at Interface Datastore 107) obtains (730-1b) data from Storage Devices 710-1 and 710-3 (at High-Volume Datastore 106). The different data obtained by the two different storage devices of Interface Datastore 107 optionally corresponds to different ranges of data. For example the shard of the "view" in Storage Device 720-1a includes user profiles for users with last names from A to M, while the shard of the "view" in Storage Device 720-1b includes user profiles for users with last names from N to Z.

The distinction between the example scenarios shown in FIGS. 7A and 7B is useful, for example, if the data (or "view" of the data) obtained from High-Volume Datastore 106 exceeds a predefined storage or size limit of a single storage device at Interface Datastore 107. In this scenario, if High-Volume Datastore 106 has prior knowledge of the storage limits or capabilities of the individual storage devices at Interface Datastore 107 (e.g., if Interface Datastore 107 communicates information about the storage limits of its storage devices as part of the query), then High-Volume Datastore 106 optionally transmits data in partial "views" or segments such that the storage limit is not exceeded at the storage devices of Interface Datastore 107.

Accordingly, some embodiments provide a first and second request for data from Interface Datastore 107 to High-Volume Datastore 106; where first data-retrieval criteria (governing the first request for data) include filter criteria and first range criteria; and second data-retrieval criteria (governing second request for data) include the filter criteria and second range criteria different from the first range criteria. Accordingly, a first set of data (selected based on the first data retrieval criteria) and a second set of data (selected based on the second data retrieval criteria) are retrieved from First Database 140 (of High-Volume Datastore 160). A second database (e.g., Second Database 135 stored, for instance, on Storage Device 720-1a of FIG. 7B) is generated from the first set of data. Furthermore, a third database (for instance, stored on Storage Device 720-1b) is generated from the second set of data. Both the second and third databases operate in accordance with the second database processing capabilities (different from the database processing capabilities of First Database 140, as explained below with reference to FIGS. 9F-9H). Alternatively, the second and third databases could be referred to as first and second portions of a same database.

For example, the first request is a request for all contacts meeting predefined filter criteria with names starting from A to M (first range criteria) and the second request is a request for all contacts meeting predefined filter criteria with names starting from N to Z (second range criteria). In this example, results matching the first range criteria (names from A-M) are stored in the second database on device 720-1*a* at Interface Datastore 107 and results matching the second range criteria (names from A-M) are stored in the third database on device 720-1*b* at Interface Datastore 107. In this example, results corresponding to contacts with names starting from A to M are accommodated on device 720-1*a*, but any additional data (e.g., results corresponding to names starting from N to Z) would result in the storage limit of device 720-1*a* being exceeded. Distribution of data in Second Database 135 over multiple storage devices provides the advantage of efficiently managing data load storage to facilitate efficient data retrieval. Moreover, the distribution of data in Second Database 135 is advantageous in situations where the volume of data exceeds the storage limit of an individual storage device at Interface Datastore 107.

Figure 7C:
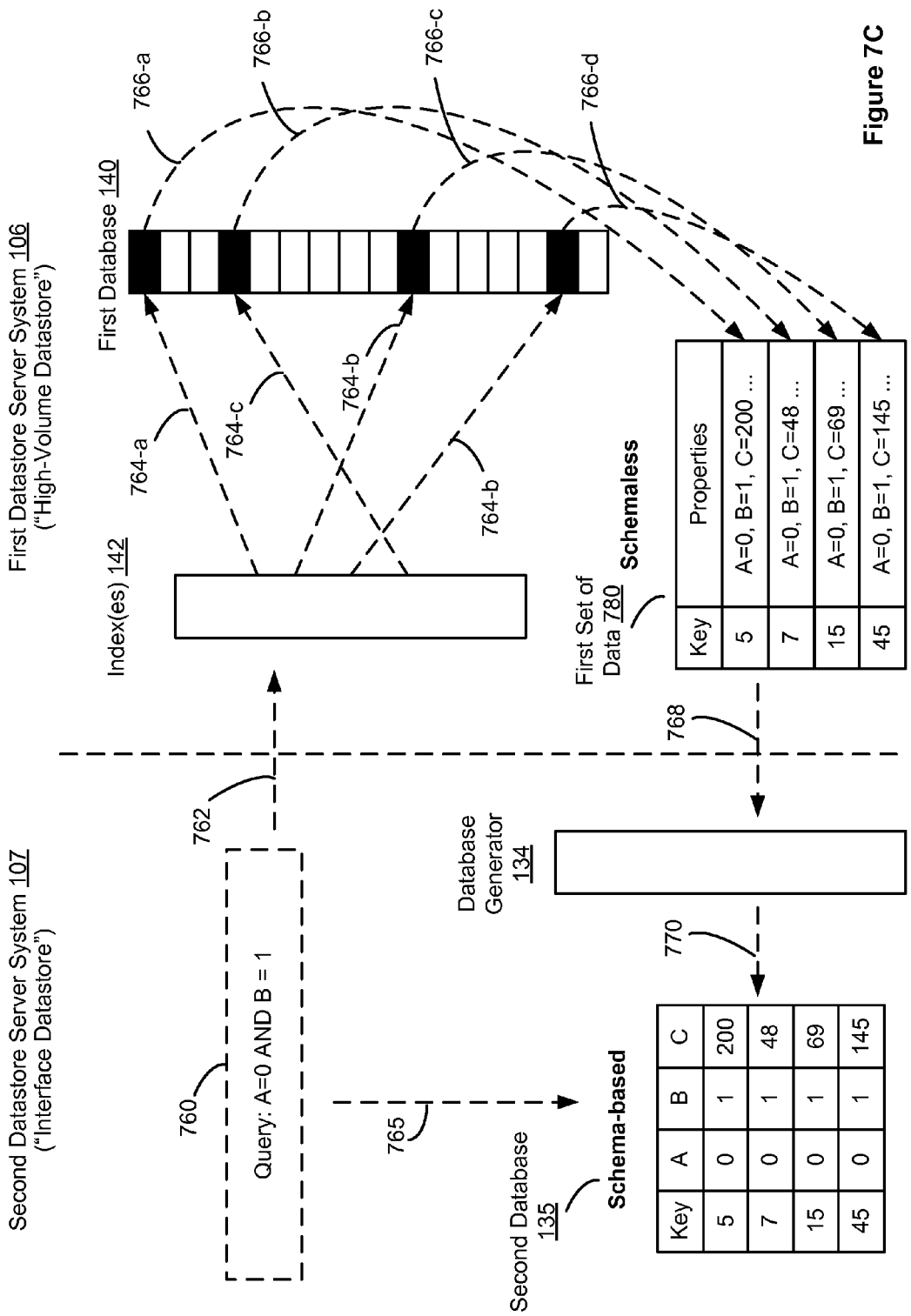
FIG. 7C is a block diagram illustrating generation of a second database at the Interface Datastore based on data from the High-Volume Datastore, in accordance with some embodiments.

FIG. 7C illustrates an example of the interaction between High-Volume Datastore 106 and Interface Datastore 107 for the generation of Second Database 135 from First Database 140. In some embodiments, the generation of Second Database 135 is prompted by or occurs in response to (762) a query (e.g., Query 760) being received from Client 102 or App Server 104. In alternative embodiments, Second Database 135 is generated preemptively and the query (e.g., Query 760) is generated by Interface Datastore 107 in anticipation of a query being received from Client 102 or App Server 104 so that when a similar query is later received from Client 102 or App Server 104, Second Database 135 is already available for use in responding to the query.

High-Volume Datastore 106 optionally includes multiple Index(es) 142 for different properties of a plurality of entities having multiple properties and unique identifiers (keys). In some embodiments, each of the index portions are internally sorted in a default sort order (e.g., the index entries within a portion are sorted by key, which is not typically a user selected sort order, as the values of the keys are not usually known by the user and frequently do not correspond to any property that is relevant to the user). These sorted index portions enable High-Volume Datastore 106 to efficiently retrieve entities matching a search query.

In some implementations, High-Volume Datastore 106 identifies index entries (764) from Index(es) 142 in response to a search query received from Interface Datastore 107. In this scenario, when a search query (e.g., Query 760) is received (762), indexes are selected to perform the search query based on the properties that are included in the index. Moreover, when processing a search query specifying a filter, High-Volume Datastore 106 (or First Query Engine 126 of High-Volume Datastore 106) only needs to look for index entries matching the search query in the portion of the index matching the filter, because the index is sorted so that index entries in all other sections of the index do not match the filter and thus are irrelevant to the search query.

High-Volume Datastore 106 retrieves (766) entities from an entity database (e.g., First Database 140 stored at High-Volume Datastore 106) based on the index entries identified from Index(es) 142. After retrieving the entities, High-Volume Datastore 106 generates a first set of data (e.g., First Set of Data 780, FIG. 7C) based on the retrieved entities. In some implementations, First Set of Data 780 is schemaless and has entities (e.g., data objects) having keys (e.g., unique identifiers), properties and content of the entities, similar to First Database 140. In some embodiments, a schema generator (e.g., Schema Generator 420) additionally generates an empirically-determined schema for First Set of Data 780 and/or First Database 140 (e.g., as described with reference to FIG. 6B).

First Set of Data 780 and, optionally, information about an associated empirically-determined schema is transmitted (768) from High-Volume Datastore 106 to Interface Datastore 107. At Interface Datastore 107, First Set of Data 780 (and optionally, information about the associated empirically-determined schema) is received from High-Volume Datastore 106 and is used by Database Generator 134 to generate Second Database 135. In some embodiments, Second Database 135 has an associated schema and operates in accordance with second database processing capabilities, different from the first database processing capabilities (as explained below with reference to FIGS. 9F-9H).

Interface Datastore 107 provides a requestor (e.g., Client 102 or App Server 104) access to data retrieved from High-Volume Datastore 106 via Second Database 135. Interface Datastore 107 receives a query from a requestor either prior (762) to generation of Second Database 135 or after (765) generation of Second Database 135 and processes the query using data in Second Database 135 and transmits a response to the requestor (e.g., Client 102 or App Server 104).

In some implementations, as the entities in First Database 140 are updated (e.g., modified, added or deleted), High-Volume Datastore 106 (or Index Generator 418) updates Index(es) 142 accordingly (e.g., by updating the values for properties for the entities when the entities are modified). In some embodiments, these updates are used to periodically update Second Database 135 so as to keep the "view" of First Database 140, that is represented by Second Database 135, current. In some embodiments, upon receiving instructions from a requestor (e.g., Client 102 or App Server 104) to modify First Set of Data 780, Interface Datastore 107 modifies First Set of Data 780 and provides information to High-Volume Datastore 106 indicative of modifications to First Set of Data 780 (as described in further detail with reference to FIG. 9D). Similarly, in some embodiments, if the entities of First Database 140 that were identified to select First Set of Data 780 are updated (e.g., modified) in First Database 140, then the corresponding entities in Second Database 135 are updated accordingly (as explained in further detail with reference to FIG. 9C).

Generating Responses to Queries

Figure 8:
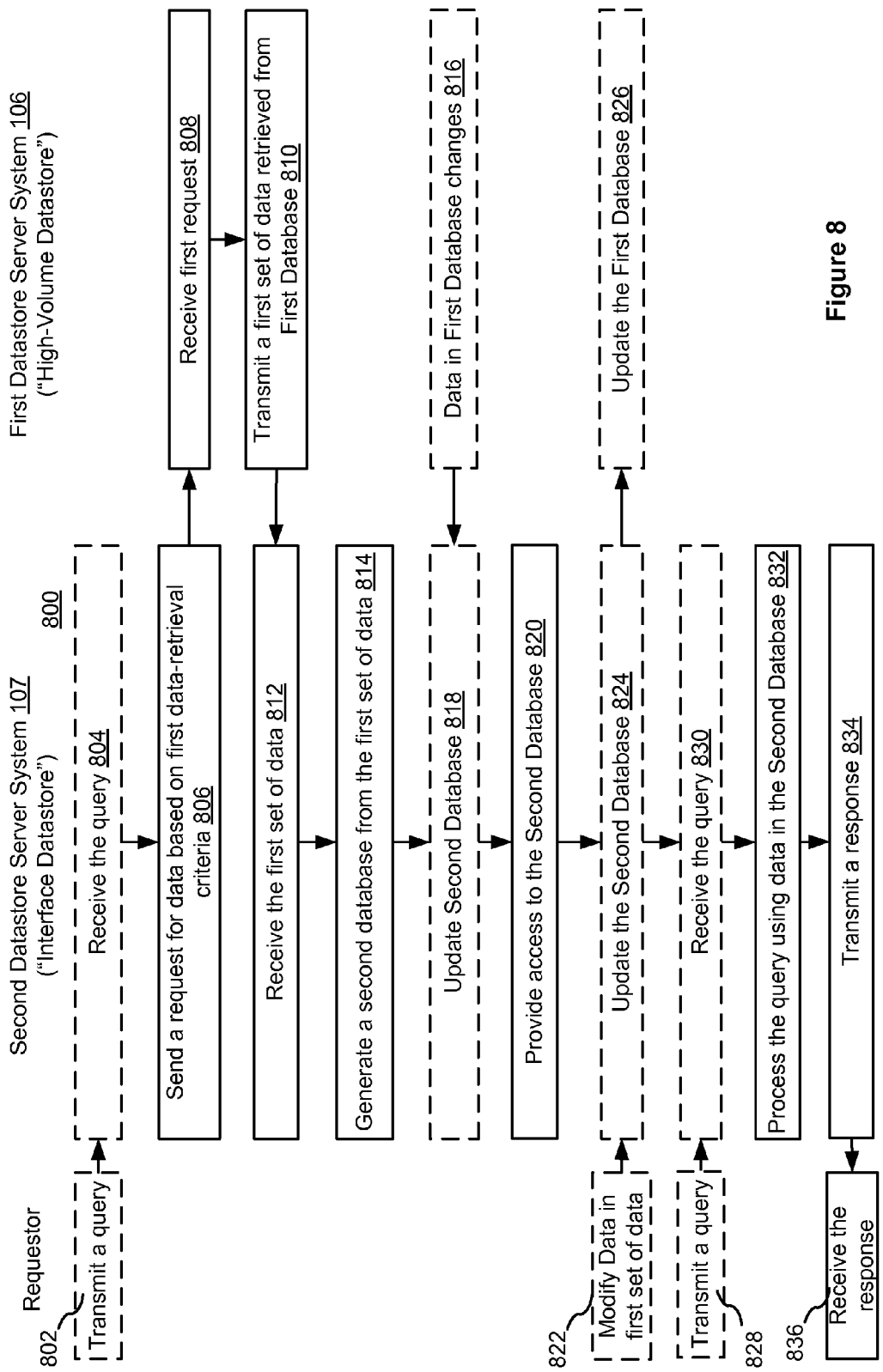
FIG. 8 includes a flow chart illustrating a method for generating the second database and responding to client-specified queries at the Interface Datastore based on information from a client and the High-Volume Datastore, in accordance with some embodiments.

FIG. 8 includes a flowchart representing a method 800 for receiving and processing queries at an interface datastore and returning responses, according to certain embodiments. Method 800 is, optionally, governed by instructions that are stored in a non-transitory computer readable storage medium and that are executed by one or more processors of one or more computer systems (e.g., Client 102, App Server 104, High-Volume Datastore 106, Interface Datastore 107). Each of the operations shown in FIG. 8 typically corresponds to instructions stored in a computer memory or non-transitory computer readable storage medium (e.g., memory 206 of Client 102 in FIG. 2, memory 306 of App Server 104 in FIG. 3, memory 406 of High-Volume Datastore 106 in FIG. 4 or memory 506 of Interface Datastore 107 in FIG. 5). The computer readable storage medium optionally includes a magnetic or optical disk storage device, solid state storage devices such as Flash memory, or other non-volatile memory device or devices. The computer readable instructions stored on the computer readable storage medium optionally includes one or more of: source code, assembly language code, object code, or other instruction format that is executed or interpreted by one or more processors. In various embodiments, some operations in method 800 are, optionally, combined and/or the order of some operations are, optionally, changed from the order shown in FIG. 8.

In some embodiments, a requestor (e.g., Client 102 or App Server 104) transmits (802) a query to Interface Datastore 107 and Interface Datastore 107 receives (804) the query. For example, as shown in FIG. 7C, Query 760 (A=0 AND B=1) is received at Interface Datastore 107 from the requestor. Interface Datastore 107 sends (806) a request to High-Volume Datastore 106 for data based on first data-retrieval criteria (e.g., as described in greater detail with reference to operation 958 in method 900, described below). For example, as shown in FIG. 7C, Interface Datastore 107 sends a request (762, FIG. 7C) to High-Volume Datastore 106 in response to Query 760 received from Client 102. However, in some situations, the request sent to High-Volume Datastore 106 is a preemptive request and does not correspond to a query that was previously received from a requestor, but is generated by Interface Datastore 107 in anticipation of future queries that are likely to be received from a requestor.

High-Volume Datastore 106 receives (808) the first request. High-Volume Datastore 106 transmits (810) a first set of data (e.g., First Set of Data 780, FIG. 7C) retrieved from First Database (e.g., First Database 140, FIG. 7C) to Interface Datastore 107, which receives (812) the first set of data. After receiving the first set of data from High-Volume Datastore 106, Interface Datastore 107 generates (814) a second database (e.g., Second Database 135, FIG. 7C) from the first set of data.

In some situations, after transmitting the first set of data, data in First Database (e.g., First Database 140, FIG. 7C) changes (816) at High-Volume Datastore 106. Based on the changes to data in the First Database, Interface Datastore 107 updates (818) Second Database, as explained further with reference to FIG. 9C (method 900, operations 944-950).

After generating and, optionally, updating the second database, Interface Datastore 107 provides (820) access to the Second Database (e.g., Second Database 135, FIG. 7C) to potential requestors (e.g., Clients 102 and/or App Servers 104). In some situations, Interface Datastore 107 advertises the availability of Second Database 135—and optionally the database processing capabilities of Second Database 135—to Client 102 or App Server 104. To this end, Interface Datastore 107 optionally transmits and/or broadcasts a message indicating the availability and capabilities of Second Database 135, or provides information about Second Database 135 in a location that is accessible to potential requestors. For example, Interface Datastore 107 lists a plurality of databases that are available for use, indicating the types of queries that are handled by each of the databases and the ranges of data that are contained in the database (e.g., a database that provides information about businesses that are located within a geospatial region, a relational user database for users of a particular website, and a database that includes full text searching of news stories from newspapers and magazines published today). A requestor that has a respective query to be processed can select a database from the list of databases that includes appropriate capabilities for responding to the query and/or can request that a new database be generated if none of the databases in the list of databases includes appropriate capabilities.

In some embodiments, the requestor modifies (822) data in the first set of data. For example, the requestor transmits a query or request to High-Volume Datastore 106 for adding, deleting, updating, and/or replicating data entities stored at Second Database 135 at Interface Datastore 107. Interface Datastore 107 updates (824) the second database and transmits the changes to data in the first data set to High-Volume Datastore 106, which updates (826) the First Database 140 in High-Volume Datastore 106. Operations 822-826 of method 800 are described further with reference to operations 952-956, method 900 (FIG. 9D). In many embodiments, a requestor can also directly modify data in First Database 140 by sending data modification requests directly to High-Volume Datastore 106. When data is modified at High-Volume Datastore 106, the changes to the data can be sent to Interface Datastore 107 as described above with respect to operations 816 and 818.

In some embodiments, the requestor transmits (828) a query to Interface Datastore 107 after Second Database 135 has been generated (e.g., when Second Database 135 was generated in response to a prior query from a requestor or when Second Database 135 was preemptively generated in anticipation of receiving the query). Interface Datastore 107 receives (830) the query. Thus, the requestor may transmit a query (e.g., Query 760, FIG. 7C) either prior to the generation of Second Database 135 (as described above with reference to operation 802), or after (as described above with reference to operation 828) the generation of Second Database 135. After receiving the query, Interface Datastore 107 processes (832) the query using data in Second Database 135 and transmits (834) a response to the requestor. In response to transmitting the query, the requestor receives (836) the response generated from Second Database 135. Operations 832-834 (method 800) are described further with reference to operations 932-942 (method 900) below.

In summary, data from a First Database (e.g., First Database 140 stored at High-Volume Datastore 106) is retrieved at Interface Datastore 107 either in response to or in anticipation of a query from the requestor. As explained with reference to FIGS. 7A-7C above data retrieved at Interface Datastore 107 constitutes one or more "views" of data stored in First Database 140 and is used to generate Second Database (e.g., Second Database 135 stored at Interface Datastore 107) that operates in accordance with a second set of database processing capabilities different from a first set of database processing capabilities of First Database. After Second Database 135 has been generated (and optionally updated), the query received from the requestor is processed at Interface Datastore 107 using data stored in Second Database 135 to generate a response.

In a typical situation Second Database 135 is smaller than First Database 140 and thus is not constrained by the efficiency considerations of very large databases. As such, Second Database 135 can organize and store data and information about the data in a way that would be impractical for First Database 140 but that provides more flexibility in interacting with and searching the data (e.g., by imposing a predefined schema on the data and generating specialized data structures that enable the performance of relational and/or geospatial queries on the data). Consequently, while First Database 140 provides access to a large quantity of data, Second Database 135 provides a different (and typically more expansive) set of tools for analyzing and accessing a smaller set of data. By carefully selecting the subset of data in First Database 140 that is used to generate Second Database 135, the most important data from First Database 140 will be made accessible in a data "view" corresponding to Second Database 135, thereby providing the benefits of the efficiency of the High-Volume Datastore 106 and the flexibility of the Interface Datastore 107.

It should be understood that the particular order in which the operations in FIG. 8 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 900 (described herein with reference to FIGS. 9A-9H) are also applicable in an analogous manner to method 800 described above with respect to FIG. 8. For example, the queries, entities, and search results described above with reference to method 800 optionally have one or more of the characteristics of the various queries, entities, and search results described herein with reference to method 900. For brevity, these details are not repeated here.

Responding to Queries Based on Generation of Second Database

FIGS. 9A-9H include a flowchart representing a method 900 for processing queries and returning responses based on the generation of a second database at an interface datastore, according to certain embodiments. Method 900 is, optionally, governed by instructions that are stored in a non-transitory computer readable storage medium and that are executed by one or more processors of one or more servers (e.g., Interface Datastore 107, FIG. 5). Each of the operations shown in FIGS. 9A-9H typically corresponds to instructions stored in a computer memory or non-transitory computer readable storage medium (e.g., memory 506 of Interface Datastore 107 in FIG. 5). The computer readable storage medium optionally includes a magnetic or optical disk storage device, solid state storage devices such as Flash memory, or other non-volatile memory device or devices. The computer readable instructions stored on the computer readable storage medium optionally includes one or more of: source code, assembly language code, object code, or other instruction format that is executed or interpreted by one or more processors. In various embodiments, some operations in method 900 are optionally combined and/or the order of some operations are optionally changed from the order shown in FIGS. 9A-9H.

In some embodiments, Interface Datastore 107 receives (902) a query (e.g., Query 760) from a client. Interface Datastore 107 sends (904), to a first database (e.g., First Database 140), a first request for data based on first data-retrieval criteria. For example, as shown in FIG. 7C, Interface Datastore 107 receives Query 760 (e.g., from Client 102 or App Server 104) and sends (762, FIG. 7C) a representation of the query (e.g., filter criteria "A=0 AND B=1") to First Database 140 at High-Volume Datastore 106.

The first database is (906) schemaless and operates in accordance with first database processing capabilities. For example, the first database (e.g., First Database 140, FIG. 7C and FIG. 6A) does not have a predefined structure that is imposed on data stored in the first database. In some embodiments, the first database is not (908) a relational database. In some embodiments, the first data-retrieval criteria are defined (910) in accordance with the query (e.g., in situations where a respective query is received prior to generating a second database for responding to the respective query). In some embodiments, when the second database (e.g., Second Database 135) is generated reactively (e.g., in response to a query received from a requestor such as Client 102 or App Server 104), a response to the query is generated prior to completion of generating the second database using preliminary data received from the first database, so as to produce a response to the query more quickly and the second database is subsequently updated for responding to subsequent queries.

Interface Datastore 107 receives (912), in response to the first request, a first set of data from the first database for use in generating a database that can be used to respond to queries that are not supported by the first database. For example, as shown in FIG. 7C, Interface Datastore 107 receives (768, FIG. 7C) First Set of Data 780 from First Database 140. The first set of data is selected (914) by the first database in accordance with the first data-retrieval criteria. For example, as shown in FIG. 7C and as explained above, First Database 140 selects (766, FIG. 7C) entities, based on the matching index entries from Index(es) 142 in accordance with the filter criteria specified by Query 760.

Interface Datastore 107 generates (916) a second database from the first set of data selectively retrieved from the first database. For example, as shown in FIG. 7C, Interface Datastore 107 (or Database Generator 134 of Interface Datastore 107) generates Second Database 135 from First Set of Data 780 selectively retrieved from First Database 140. Second Database 135 has (918) an associated schema and operates in accordance with second database processing capabilities different from the first database processing capabilities (as described with reference to operation 974). In some embodiments (e.g., where First Database 140 is not a relational database), Second Database 135 is (920) a relational database. In some embodiments, Second Database 135 is generated (922) prior to receiving the query (e.g., the query described below with reference to operation 930).

In some embodiments, the first database comprises data stored (924) in a plurality of storage devices. The first set of data includes respective data items retrieved from M of the storage devices, where M is two or more. The second database, including the first set of data, is stored on N storage devices, where N is less than M (e.g., the data in First Database 140 is sharded to reduce load on the storage devices, and the data in the second database is collected together for ease of access as described above with reference to FIGS. 7A-7B).

In some embodiments, prior to receiving the query, Interface Datastore 107 provides (926) the client with information indicating that the second database is available for processing data requests. In some embodiments, the information indicating that the second database is available includes an indication of the type of data that is stored in the second database. For example, Interface Datastore 107 transmits or broadcasts a message to one or more client(s) indicating the availability of data (e.g., information about entities, properties, schema) and/or the database processing capabilities of second database. Alternatively, Interface Datastore 107 stores information about available databases at a location that is known by potential requestors, so that the requestors can determine whether Interface Datastore 107 has a database with appropriate capabilities for responding to a query.

Interface Datastore 107 provides (928) access to the first set of data in the second database in accordance with the second database processing capabilities. A more detailed explanation of different types of database processing capabilities is provided below with reference to FIGS. 9F and 9H. In some embodiments, the second database processing capabilities enable the second database to efficiently perform data processing operations on the first set of data that cannot be efficiently performed by the first database. For example, second database provides the capability to combine entities from two or more different tables of the database based query-specified criteria (e.g., second database supports SQL join operations)—a capability not efficiently supported by the first database.

In some embodiments, Interface Datastore 107 receives (930), from a client, a query that can be processed using data in the second database and Interface Datastore 107 processes (932) the query using data in the second database to generate a response. For example, in FIG. 7C, if Second Database 135 has already been generated when Interface Datastore 107 receives Query 760, then Query 760 can be processed using data in Second Database 135. In some implementations, processing the query uses (934) at least a respective database processing capability of the second database processing capabilities that is not one of the first database processing capabilities (e.g., one of the database processing capabilities described with reference to FIG. 9E). In some embodiments, the respective database processing capability of the second database processing capabilities includes one or more of the database processing capabilities described below with reference to FIG. 9H (operation 988).

In some embodiments, the second database has (936) a first portion and a second portion. For example, as shown in FIG. 7B, Second Database 135 has a first portion 1A (stored on storage device 720-1*a*) and a portion 1B (stored on storage device 720-1*b*). In some implementations, Interface Datastore 107 accesses (938) the first portion of the second database on a first storage device and accesses (940) the second portion of the second database on a second storage device that is different from the first storage device. In some embodiments, the second database is divided into more than two portions (e.g., 3, 4, 5 . . . N), and is stored on a corresponding number of storage devices. For example, the first request is a request for all contacts meeting predefined criteria and the first portion stores contacts with names from A to M and the second portion stores contacts with names from N to Z. Dividing or sharding the data retrieved at Interface Datastore 107 over two or more storage devices provides the advantage of spreading device access load over multiple storage devices, thereby improving the speed of data retrieval and reducing the load on any specific storage device. Furthermore, if data retrieved from the first database exceed the storage capability or storage limit of any individual storage device and Interface Datastore 107, then the data can be distributed over two or more storage devices to accommodate the retrieved data, rather than arbitrarily truncating the set of data and/or limiting the quantity of data in Second Database 107 based on the storage capacity of physical storage devices at Interface Datastore 107. For example, if a storage device at Interface Datastore 107 is unable to store all retrieved results corresponding to names starting from A to Z, but is able to store results corresponding to names from A to M, then the remaining results (i.e., corresponding to names starting from N to Z) are stored on a separate storage device.

After receiving and processing the query, Interface Datastore 107 transmits (942) the response to the client. In summary, after generating a second database from data stored in a first database at High-Volume Datastore 106, Interface Datastore 107 uses the second database to process a query that requires database processing capabilities of the second database that are not database processing capabilities of the first database. For example, the query is a geospatial query that is supported by the second database but is not supported by the first database.

In some embodiments, after generating (see operation 916 above) the second database from the first set of data, and optionally, after providing access (see operation 928 above) to the first set of data in the second database, data in the second database is updated. In particular, Interface Datastore 107 receives (944), from the first database, a second set of data. In some implementations, the second set of data is selected (946) by the first database in accordance with the first data-retrieval criteria (e.g., the same data-retrieval criteria that were used to generate the first set of data). In some embodiments, the second set of data includes (948) modifications to the first set of data. Interface Datastore 107 modifies (950) the first set of data in the second database in accordance with the second set of data (e.g., the second set of data adds data items, deletes data items or updates data items with respect to the first set of data). For example, as explained above with reference to FIG. 7C, after providing access to First Set of Data 780 in Second Database 135, Interface Datastore 107 receives from First Database 140 a second set of data optionally selected by First Database 140 in accordance with the first data-retrieval criteria and optionally including modifications to First Set of Data 780. In this example, Interface Datastore 107 modifies First Set of Data 780 in Second Database 135 in accordance with the second set of data. In some embodiments, the second set of data is selected by the first database in response to detecting modifications of data items that satisfy the first data-retrieval criteria. In some embodiments, the second set of data includes one or more new entities that match the first data-retrieval criteria that were created after the first set of data was generated.

In some embodiments, after generating (see operation 916 above) the second database from the first set of data, and optionally, after providing access (see operation 928 above) to the first set of data in the second database, modifications made to data in the second database are reported back to the first database. In particular, Interface Datastore 107 receives (952), from a client, instructions to modify the first set of data. In some embodiments, in response to the instructions to modify the first set of data, Interface Datastore 107 modifies (954) the first set of data (e.g., by updating Second Database 135). In some implementations, Interface Datastore 107 sends (956), to the first database, information indicative of modifications to the first set of data (e.g., entities added, modified or deleted while updating Second Database 135). While, in many circumstances, requests to modify the first data set would go directly to the first database (which would then send an update to the second database), in some embodiments, a request to modify the first set of data goes to the second database and the second database subsequently sends instructions to modify the first set of data to the first database (e.g., when the second database operates as a write-back cache). In other words, in some implementations, the second database (e.g., the "sharded, prioritized" view of the data) reports back to the first database with changes made to entities in the first set of data.

In some embodiments, the first data-retrieval criteria comprise (958) filter criteria and first range criteria (e.g., "names from A to M") so that a respective database for responding to particular types of queries that is stored at Interface Datastore 107 can be sharded (e.g., divided into multiple databases stored across multiple different storage devices to improve query performance, as described with reference to FIG. 7B, above). In some embodiments, after generating (see operation 916 above) the second database from the first set of data, and optionally, after providing access (see operation 928 above) to the first set of data in the second database, Interface Datastore 107 sends (960), to the first database, a second request for data based on second data-retrieval criteria. In some embodiments, the second data-retrieval criteria comprise (962) the filter criteria and second range criteria (e.g., "names from N to Z") different from the first range criteria. In some embodiments, Interface Datastore 107 receives (964), in response to the second request, a second set of data from the first database. In some implementations, the second set of data is selected (966) by the first database in accordance with the second data-retrieval criteria (e.g., contacts with names from N to Z). In some embodiments, Interface Datastore 107 generates (968) a third database from the second set of data received from the first database. In some implementations, the third database operates (970) in accordance with the second database processing capabilities. In other words, in this implementation, a single respective database that has the second database processing capabilities is divided into the second database and the third database so that it can be stored on two different storage devices.

For example, as shown in FIG. 7B, Interface Datastore 107 receives a first set of data (1A stored on storage device 720-1a, FIG. 7B) in response to a first request for data based on first data retrieval criteria (including first range criteria) and a second set of data (1B stored on storage device 720-1b, FIG. 7B) in response to a second request for data based on second data retrieval criteria (including second range criteria). In some embodiments, Interface Datastore 107 provides (972) access to the second set of data in the third database in accordance with the second database processing capabilities. In other words, in these embodiments, the respective server system (e.g., Interface Datastore 107) generates two or more views of data from the first database by providing the first database with two distinct requests for data, where the first view (e.g., the second database) includes data in a first range specified by a first request and the second view (e.g., the third database) includes data in a second range specified by the second request. For example, the first request is a request for all contacts meeting predefined criteria with names from A to M and the second request is a request for all contacts meeting predefined criteria with names from N to Z. In this embodiment, the second database and the third database share the second set of database processing capabilities, which are different from the first set of database processing capabilities of the first database.

As described above with reference to operation 918, the second database processing capabilities are different (974) from the first database processing capabilities. In some embodiments, the first database processing capabilities are database processing capabilities that enable (976) the first database to perform data operations (e.g., store and execute queries) against large sets of data more efficiently than the second database.

In some embodiments, the second database is incapable (978) of storing data in excess of a predefined size limit (e.g., number of data items or number of bytes of data), whereas the first database processing capabilities are database processing capabilities that enable (978) the first database to perform data operations (e.g., store and execute queries) against a set of data having a size greater than the predefined size limit. In some situations the predefined size limit is based on a hardware configuration of a storage device that stores the second database. In some situations the predefined size limit is a size limit imposed by software (e.g., a size restriction imposed so as to improve performance of the second database).

In some embodiments, the first data-retrieval criteria specify (980) a prioritization of data to be received for the second database, the second database has a predefined size limit and the first database includes an amount of data matching the first data-retrieval criteria that exceeds the predefined size limit. For example, the first data-retrieval criteria, optionally, prioritize data based on one or more of: recency of creation of entities, recency of modification of entities, relevance of entities to a query, proximity of entities to a particular location, or any other property by which entities can be sorted. In these embodiments, the second database includes a prioritized subset of the data matching the first data-retrieval criteria that is stored in the first database. In some situations, the second database includes only a prioritized subset of the data matching the first data-retrieval criteria that is stored in the first database. In some implementations, an amount of data corresponding to the predefined size limit is transmitted to the first database. In other implementations, the interface datastore continues to accept new data from the first database until the predefined size limit has been reached and then starts to reject additional data, at which point the first database determines that the predefined size limit has been reached. For example, the data is incrementally requested from the first database by the second interface datastore until the predefined size limit is reached, at which point the interface datastore stops requesting the data from the first database.

In some embodiments, the first database processing capabilities include (981) a first set of database processing capabilities—such as those described below with reference to operations 982-987—not included in the second database processing capabilities. In some embodiments, the first set of database processing capabilities include (982) a capability that is contingent upon the first database including a plurality of sorted indexes adapted for retrieving data from a schemaless database (e.g., some queries are supported by the specialized data structures, while other queries are not supported by the specialized data structures). For example, as shown in FIGS. 6A-6B and FIG. 7C, First Database 140 includes sorted Index(es) 142 adapted for retrieving data from a schemaless First Database 140. In some embodiments, the first set of database processing capabilities include (983) a capability to generate a sorted response to a query, where data in the sorted response is sorted in accordance with predefined criteria without performing a sorting operation after retrieving the data (e.g., by retrieving data that is already sorted so that the results do not need to be pulled into memory to perform an in-memory sort). For example, when a query that includes a custom sort order is executed using an index (e.g., Index 142, FIG. 6B) sorted by values of properties specified in the custom sort order, the results are generated in the custom order, without need for subsequent sorting. Retrieving pre-sorted values enables High-Volume Datastore 106 to efficiently retrieve entities matching filter criteria that are prioritized in accordance with the sort order of the indexes. In some embodiments, the first set of database processing capabilities include (984) a capability to retrieve data, where a computational cost to retrieve the data scales with a number of results retrieved rather than a number of entities stored in the first database (e.g., candidate entities that could have been retrieved by the search but did not match the search criteria).

In some embodiments, the first set of database processing capabilities include (985) a capability to store data distributed across a number of storage devices, where a subset of the data can be retrieved from one of the storage devices without accessing all of the storage devices across which the data is distributed. In other words, a storage device that does not include any of the subset of data can be skipped when retrieving the subset of the data, thereby reducing the computational cost of retrieving the data. For example, as explained above with reference to FIG. 7A, storage device 720-2 of Interface Datastore 107 obtains (730-2) data from storage device 710-3 and storage device 710-M of High-Volume Datastore 106 without accessing storage device 710-1 and storage device 710-2 of High-Volume Datastore 106. In some embodiments, the computational cost of retrieving data from the storage devices increases linearly (or increases more slowly than linearly) with the number of storage devices across which the data is distributed. In some embodiments, the first set of database processing capabilities include (986) a capability to store data without reference to a predefined schema (e.g., the schema that is used by the second database). Storing data without reference to a predefined schema provides flexibility when storing the data but can make it difficult or impossible to easily retrieve data using query syntax that is schema-dependent. In some embodiments, the first set of database processing capabilities include (987) a capability to automatically replicate stored data across a plurality of servers.

In some embodiments, the second database processing capabilities include (988) a second set of database processing capabilities—such as those described below with reference to operations 989-994—not included in the first database processing capabilities. The second set of database processing capabilities include (989) a capability that is contingent upon the schema being strictly enforced. For example when counting records, or performing other aggregation tasks if a database schema is being strictly enforced, each record will have a known length (e.g., the combined lengths of the fields specified in the database schema) and thus a number of records can be calculated based on the total size of the second database divided by the known record size. Similarly, when the size of each of the records is a known record size, the second database (e.g., Second Database 135) can be traversed by specifying an offset from a particular record and the server system can skip from one record to another record by skipping by an integer multiple of the known record size. In this example, efficient skipping between records can only be performed if the records have a known length (i.e., if a record-size schema is strictly enforced). In contrast, in a schemaless database (e.g., First Database 140), such operations take linear time corresponding to the number of records being skipped, as each skipped record has to be individually examined. In a database with a strictly enforced schema (e.g., a schema-based database), determining a number of records or skipping any number of records is a constant time operation that is not affected by the number of records in the schema-based database.

In some embodiments, the second set of database processing capabilities include (990) a capability to process at least one respective query having a query-syntax that is not supported by the first database (e.g., the first database is restricted to performing only queries that use query-syntax from a predefined set of allowed query-syntax expressions, while the second database is capable of performing queries that use a broader range of query-syntax or even arbitrary query-syntax). In some embodiments, the second set of database processing capabilities include (991) a capability to search within content of one or more entities in accordance with one or more query terms provided in the query (e.g., in situations where the first set of database processing capabilities do not include full-text search within content of entities). In some embodiments, the first database is restricted to searching metadata of entities, while the second database is capable of performing a full-text search of content of one or more of the entities.

In some embodiments, the second set of database processing capabilities include (992) a capability to compare a stored metadata value (e.g., Global Positioning System—GPS—coordinates) for a data entity to multiple bounding parameters (e.g., geospatial boundaries) to determine whether the metadata value satisfies a query component corresponding to the multiple bounding parameters. In some embodiments, the first database is restricted from performing multiple inequalities and thus does not have the capability to compare a metadata value (e.g., GPS coordinates) against multiple query parameters (e.g., values corresponding to proximity/bounding constraints for a geospatial query), while the second database is capable of performing complex queries that include comparing a metadata value against multiple parameters and is thus able to perform complex queries such as geospatial queries. An example of a geospatial query is a query for a restaurant best matching search criteria (e.g., "Sushi" and "cheap") within a predefined geographical area (e.g., an area defined by a set of boundaries or a radius around the user's current location). In some embodiments, the second set of database processing capabilities include (993) a capability to combine entities from a plurality of different tables of the second database in accordance with criteria specified in the query (e.g., the capability to perform an SQL join operation). In some embodiments, the second set of database processing capabilities include (994) a capability to reject the query in accordance with a determination that the query does not conform to the schema associated with the second database. In other words, the second database enforces a predefined schema, while the first database does not enforce a schema and thus does not reject queries for failure to conform to a predefined schema.

It should be understood that the particular order in which the operations in FIGS. 9A-9H have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 800 (described herein with reference to FIG. 8) are also applicable in an analogous manner to method 900 described above with respect to FIGS. 9A-9H. For example, the queries, entities, and search results described above with reference to method 900 optionally have one or more of the characteristics of the various queries, entities, and search results described herein with reference to method 800. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a respective server system having one or more processors and memory storing one or more programs that when executed by the one or more processors cause the respective server system to perform the method, the method comprising:
sending, to a first database, a first request for data based on first data-retrieval criteria, wherein the first database is schemaless and operates in accordance with first database processing capabilities;
receiving, in response to the first request, a first set of data from the first database, wherein the first set of data is selected by the first database in accordance with the first data-retrieval criteria;
generating a second database from the first set of data selectively retrieved from the first database, wherein the second database has an associated schema and operates in accordance with second database processing capabilities different from the first database processing capabilities;
providing access to the first set of data in the second database in accordance with the second database processing capabilities;
receiving, from a client, a query that can be processed using data in the second database;
processing the query using data in the second database to generate a response; and
transmitting the response to the client;
wherein
processing the query uses at least a respective database processing capability of the second database processing capabilities that is not one of the first database processing capabilities; and
the respective database processing capability of the second database processing capabilities is a database processing capability selected from the set consisting of:
a capability that is contingent upon the schema being strictly enforced;
a capability to process at least one respective query having a query-syntax that is not supported by the first database;
a capability to search within content of one or more entities in accordance with one or more query terms provided in the query;
a capability to compare a stored metadata value for a data entity to multiple bounding parameters to determine whether the metadata value satisfies a query component corresponding to the multiple bounding parameters;
a capability to combine entities from a plurality of different tables of the second database in accordance with criteria specified in the query; and
a capability to reject the query in accordance with a determination that the query does not conform to the schema associated with the second database.

2. The method of claim 1, wherein:
the second database is a relational database; and
the first database is not a relational database.

3. The method of claim 1, wherein:
the query is received prior to sending the first request to the first database; and
the first data-retrieval criteria are defined in accordance with the query.

4. The method of claim 1, wherein:
the second database is generated prior to receiving the query; and
the method further comprises, prior to receiving the query, providing the client with information indicating that the second database is available for processing data requests.
a capability to reject the query in accordance with a determination that the query does not conform to the schema associated with the second database.

5. The method of claim 1, wherein the first database processing capabilities are database processing capabilities that enable the first database to perform data operations against large sets of data more efficiently than the second database.

6. The method of claim 1, wherein the first database processing capabilities include a first set of database processing capabilities not included in the second database processing capabilities, the first set of database processing capabilities including database processing capabilities selected from the set consisting of:
a capability that is contingent upon the first database including a plurality of sorted indexes adapted for retrieving data from a schemaless database;
a capability to generate a sorted response to a query, wherein data in the sorted response is sorted in accordance with predefined criteria without performing a sorting operation after retrieving the data;
a capability to retrieve data, wherein a computational cost to retrieve the data scales with a number of results retrieved rather than a number of entities stored in the first database; and
a capability to store data distributed across a number of storage devices, wherein a subset of the data can be retrieved from one of the storage devices without accessing all of the storage devices across which the data is distributed.

7. The method of claim 1, further comprising:
receiving from the first database a second set of data, wherein:
the second set of data is selected by the first database in accordance with the first data-retrieval criteria; and
the second set of data includes modifications to the first set of data; and
modifying the first set of data in the second database in accordance with the second set of data.

8. The method of claim 1, further comprising:
receiving, from a client, instructions to modify the first set of data;
in response to the instructions to modify the first set of data, modifying the first set of data; and
sending, to the first database, information indicative of modifications to the first set of data.

9. The method of claim 1, wherein:
the second database has a first portion and a second portion; and
the method further comprises:
accessing the first portion of the second database on a first storage device; and
accessing the second portion of the second database on a second storage device that is different from the first storage device.

10. A method comprising:
at a respective server system having one or more processors and memory storing one or more programs that when executed by the one or more processors cause the respective server system to perform the method, the method comprising:

sending, to a first database, a first request for data based on first data-retrieval criteria, wherein the first database is schemaless and operates in accordance with first database processing capabilities;

receiving, in response to the first request, a first set of data from the first database, wherein the first set of data is selected by the first database in accordance with the first data-retrieval criteria;

generating a second database from the first set of data selectively retrieved from the first database, wherein the second database has an associated schema and operates in accordance with second database processing capabilities different from the first database processing capabilities; and providing access to the first set of data in the second database in accordance with the second database processing capabilities;

wherein:

the second database is incapable of storing data in excess of a predefined size limit; and the first database processing capabilities are database processing capabilities that enable the first database to perform data operations against a set of data having a size greater than the predefined size limit.

11. A method comprising:

at a respective server system having one or more processors and memory storing one or more programs that when executed by the one or more processors cause the respective server system to perform the method, the method comprising:

sending, to a first database, a first request for data based on first data-retrieval criteria, wherein the first database is schemaless and operates in accordance with first database processing capabilities;

receiving, in response to the first request, a first set of data from the first database, wherein the first set of data is selected by the first database in accordance with the first data-retrieval criteria;

generating a second database from the first set of data selectively retrieved from the first database, wherein the second database has an associated schema and operates in accordance with second database processing capabilities different from the first database processing capabilities; and providing access to the first set of data in the second database in accordance with the second database processing capabilities;

wherein:

the first data-retrieval criteria specify a prioritization of data to be received for the second database;

the second database has a predefined size limit;

the first database includes an amount of data matching the first data-retrieval criteria that exceeds the predefined size limit; and the second database includes a prioritized subset of the data matching the first data-retrieval criteria that is stored in the first database.

12. A method comprising:

at a respective server system having one or more processors and memory storing one or more programs that when executed by the one or more processors cause the respective server system to perform the method, the method comprising:

sending, to a first database, a first request for data based on first data-retrieval criteria, wherein the first database is schemaless and operates in accordance with first database processing capabilities;

receiving, in response to the first request, a first set of data from the first database, wherein the first set of data is selected by the first database in accordance with the first data-retrieval criteria;

generating a second database from the first set of data selectively retrieved from the first database, wherein the second database has an associated schema and operates in accordance with second database processing capabilities different from the first database processing capabilities; and providing access to the first set of data in the second database in accordance with the second database processing capabilities;

wherein:

the first database comprises data stored in a plurality of storage devices;

the first set of data includes respective data items retrieved from M of the storage devices, wherein M is two or more; and the second database, including the first set of data, is stored on N storage devices, wherein N is less than M.

13. A method comprising:

at a respective server system having one or more processors and memory storing one or more programs that when executed by the one or more processors cause the respective server system to perform the method, the method comprising:

sending, to a first database, a first request for data based on first data-retrieval criteria, wherein the first database is schemaless and operates in accordance with first database processing capabilities;

receiving, in response to the first request, a first set of data from the first database, wherein the first set of data is selected by the first database in accordance with the first data-retrieval criteria;

generating a second database from the first set of data selectively retrieved from the first database, wherein the second database has an associated schema and operates in accordance with second database processing capabilities different from the first database processing capabilities; and providing access to the first set of data in the second database in accordance with the second database processing capabilities;

wherein:

the first data-retrieval criteria comprise filter criteria and first range criteria; and the method further comprises:

sending, to the first database, a second request for data based on second data-retrieval criteria, wherein the second data-retrieval criteria comprise the filter criteria and second range criteria different from the first range criteria;

receiving, in response to the second request, a second set of data from the first database, wherein the second set of data is selected by the first database in accordance with the second data-retrieval criteria;

generating a third database from the second set of data received from the first database, wherein the third database operates in accordance with the second database processing capabilities; and providing access to the second set of data in the third database in accordance with the second database processing capabilities.

14. A server system, comprising:

one or more processors;

memory; and one or more programs, wherein the one or more programs are stored in the memory and configured to be executed by the one or more processors, the one or more programs including instructions for:

sending, to a first database, a first request for data based on first data-retrieval criteria, wherein the first database is schemaless and operates in accordance with first database processing capabilities;

receiving, in response to the first request, a first set of data from the first database, wherein the first set of data is selected by the first database in accordance with the first data-retrieval criteria;

generating a second database from the first set of data selectively retrieved from the first database, wherein the second database has an associated schema and operates in accordance with second database processing capabilities different from the first database processing capabilities; and providing access to the first set of data in the second database in accordance with the second database processing capabilities;

wherein:

the second database is incapable of storing data in excess of a predefined size limit; and the first database processing capabilities are database processing capabilities that enable the first database to perform data operations against a set of data having a size greater than the predefined size limit.

15. The system of claim 14, wherein the second database is a relational database; and the first database is not a relational database.

16. The system of claim 14, wherein the one or more programs, when executed by the one or more processors, further cause the server system to:

receive, from a client, a query that can be processed using data in the second database;

process the query using data in the second database to generate a response; and transmit the response to the client;

wherein processing the query uses at least a respective database processing capability of the second database processing capabilities that is not one of the first database processing capabilities.

17. A non-transitory computer readable storage medium storing one or more programs, the one or more programs comprising instructions which, when executed by a computer system with one or more processors, cause the computer system to:

send, to a first database, a first request for data based on first data-retrieval criteria, wherein the first database is schemaless and operates in accordance with first database processing capabilities;

receive, in response to the first request, a first set of data from the first database, wherein the first set of data is selected by the first database in accordance with the first data-retrieval criteria;

generate a second database from the first set of data selectively retrieved from the first database, wherein the second database has an associated schema and operates in accordance with second database processing capabilities different from the first database processing capabilities; and provide access to the first set of data in the second database in accordance with the second database processing capabilities;

wherein:

the second database is incapable of storing data in excess of a predefined size limit; and the first database processing capabilities are database processing capabilities that enable the first database to perform data operations against a set of data having a size greater than the predefined size limit.

18. The non-transitory computer readable storage medium of claim 17, wherein the one or more programs, when executed by the one or more processors, further cause the server system to:

receive, from a client, a query that can be processed using data in the second database;

process the query using data in the second database to generate a response; and transmit the response to the client;

wherein processing the query uses at least a respective database processing capability of the second database processing capabilities that is not one of the first database processing capabilities.

* * * * *

UNITED STATES PATENT AND TRADEMARK OFFICE
CERTIFICATE OF CORRECTION

PATENT NO. : 9,600,501 B1
APPLICATION NO. : 14/088283
DATED : March 21, 2017
INVENTOR(S) : Fuller Page 1 of 1

It is certified that error appears in the above-identified patent and that said Letters Patent is hereby corrected as shown below:

In the Claims

Claim 4, Column 34, Lines 5-7, please delete "a capability….the second database".

Signed and Sealed this
Sixteenth Day of May, 2017

Michelle K. Lee
*Director of the United States Patent and Trademark Office*